United States Patent
Ly et al.

(10) Patent No.: US 12,143,324 B2
(45) Date of Patent: Nov. 12, 2024

(54) DEMODULATION REFERENCE SIGNAL (DMRS) ENHANCEMENTS AND BUNDLING ON PHYSICAL CHANNELS

(71) Applicant: QUALCOMM Incorporated, San Diego, CA (US)

(72) Inventors: Hung Dinh Ly, San Diego, CA (US); Gokul Sridharan, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 391 days.

(21) Appl. No.: 17/553,597

(22) Filed: Dec. 16, 2021

(65) Prior Publication Data

US 2022/0247528 A1 Aug. 4, 2022

Related U.S. Application Data

(60) Provisional application No. 63/144,352, filed on Feb. 1, 2021.

(51) Int. Cl.
*H04L 5/00* (2006.01)
*H04L 1/08* (2006.01)

(52) U.S. Cl.
CPC .............. *H04L 5/0048* (2013.01); *H04L 1/08* (2013.01)

(58) Field of Classification Search
CPC ................................ H04L 1/08; H04L 5/0048
See application file for complete search history.

(56) References Cited

U.S. PATENT DOCUMENTS

2020/0015222 A1\* 1/2020 Huang .................. H04L 5/0053
2021/0273763 A1\* 9/2021 Wang ...................... H04W 4/40

(Continued)

OTHER PUBLICATIONS

Intel Corporation: "Discussion on Joint Channel Estimation for PUSCH", 3GPP TSG RAN WG1 #104-e, 3GPP Draft, R1-2100667, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-7, Jan. 19, 2021 (Jan. 19, 2021), XP051971137, Retrieved from the Internet: URL: https://ftp.3gpp.org/tsg_ran/WG1_RL1/TSGR1_104-e/Docs/R1-2100667.zip R1-2100667 Intel CovEnh_PUSCH_Joint_CE.docx [retrieved on Jan. 19, 2021] Section 3, p. 3-p. 5.

(Continued)

*Primary Examiner* — Melanie Jagannathan
(74) *Attorney, Agent, or Firm* — Holland & Hart / QUALCOMM Incorporated

(57) ABSTRACT

Methods, systems, and devices for wireless communications are described. Generally, a base station may configure a user equipment (UE) to perform demodulation reference signal (DMRS) enhancement whereby the UE may transmit physical uplink shared channel (PUSCH) or physical uplink control channel (PUCCH) repetitions with different DMRS densities (e.g., a first DMRS density configuration having a first or default DMRS pattern within a transmission time interval (TTI) that is higher than a second DMRS density configuration having fewer DMRSs than the normal DMRS pattern or no DMRSs within the TTI). The UE may identify TTIs (e.g., slots) that satisfy one or more phase continuity rules, and may perform DMRS enhancement in the identified TTIs, and may restart a mapping sequence indicated in the DMRS mapping pattern at each bundle interval boundary or when consecutive uplink symbol periods within a bundling interval do not satisfy a phase continuity condition.

26 Claims, 19 Drawing Sheets

(56) References Cited

U.S. PATENT DOCUMENTS

| | | | | |
|---|---|---|---|---|
| 2021/0282137 | A1* | 9/2021 | Wang | H04W 72/23 |
| 2021/0329535 | A1* | 10/2021 | Chou | H04L 1/0009 |
| 2022/0053459 | A1* | 2/2022 | Shimezawa | H04W 72/1268 |
| 2023/0291523 | A1* | 9/2023 | Hasegawa | H04L 5/0094 |
| 2023/0354340 | A1* | 11/2023 | Su | H04L 5/0012 |

OTHER PUBLICATIONS

International Search Report and Written Opinion—PCT/US2021/073001—ISA/EPO—Apr. 20, 2022.

OPPO: "Joint Channel Estimation for PUSCH", 3GPP TSG RAN WG1 #104-e, 3GPP Draft, R1-2101778, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, 7 Pages, Jan. 25, 2021 (Jan. 25, 2021), XP051975880, Retrieved from the Internet: URL: https://ftp.3gpp.org/tsg_ran/WG1_RL1/TSGR1_104-e/Docs/R1-2101778.zip R1-2101778.doc [retrieved on Jan. 25, 2021] Section 2.3, p. 3-p. 4.

Xiaomi: "Discussion on Mechanism of Joint Channel Estimation", 3GPP TSG RAN WG1 #104-e, 3GPP Draft, R1-2101128, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25-Feb. 5, 2021, 5 Pages, Jan. 18, 2021 (Jan. 18, 2021), XP051970682, Retrieved from the Internet: URL: https://ftp.3gpp.org/tsg_ran/WG1_RL1/TSGR1_104-e/Docs/R1-2101128.zip R1-2101128-Joint channel estimation 2.0. doc [retrieved on Jan. 18, 2021] Section 2.3, p. 4.

* cited by examiner

FIG. 3

DEMODULATION REFERENCE SIGNAL (DMRS) ENHANCEMENTS AND BUNDLING ON PHYSICAL CHANNELS

CROSS REFERENCE

The present Application for Patent claims the benefit of U.S. Provisional Patent Application No. 63/144,352 by LY et al., entitled "DEMODULATION REFERENCE SIGNAL (DMRS) ENHANCEMENTS AND BUNDLING ON PHYSICAL CHANNELS," filed Feb. 1, 2021, assigned to the assignee hereof, and expressly incorporated by reference herein.

FIELD OF TECHNOLOGY

The following relates to wireless communications, including demodulation reference signal (DMRS) enhancement and bundling on physical channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support demodulation reference signal (DMRS) enhancement and bundling on physical channels. Generally, a base station may configure a user equipment (UE) to perform DMRS enhancement whereby the UE may transmit physical uplink shared channel (PUSCH) or physical uplink control channel (PUCCH) repetitions with different DMRS densities (e.g., a first DMRS density configuration having a first or default DMRS pattern (e.g., a first density in time) within a transmission time interval (TTI) that is higher than a second DMRS density configuration (e.g., a second density in time) having fewer DMRSs than the normal DMRS pattern or no DMRSs within the TTI). The UE may identify TTIs (e.g., slots) that satisfy one or more phase continuity rules, and may perform DMRS enhancement in the identified TTIs. In an example, the UE may transmit a first repetition of an uplink channel in a first TTI of a bundle interval using the first DMRS density, and may transmit a second repetition of the uplink channel in a second TTI of the bundle interval using the second DMRS density (e.g., less DMRSs or no DMRSs). When phase continuity between the TTIs apply, the receiver may demodulate the PUSCH or PUCCH repetitions in the different TTIs using a channel estimate obtained from the first TTI. In some examples, the UE may apply a DMRS mapping pattern to multiple TTIs. The DMRS mapping pattern may include a sequence of one or more instances of a first DMRS density configuration and one or more instances of a second DMRS density configuration to be applied across multiple TTIs. The UE may restart the sequence indicated in the DMRS mapping pattern at each bundle interval boundary or when consecutive uplink symbol periods within a same bundling interval do not satisfy a phase continuity condition.

A method for wireless communications at a user equipment (UE) is described. The method may include receiving, from a base station, a control message configuring the UE to transmit a set of multiple repetitions of an uplink channel over a set of multiple bundle intervals, transmitting, to the base station during a first transmission time interval of a first bundle interval of the set of multiple bundle intervals, a first repetition of the uplink channel in accordance with a first demodulation reference signal density configuration, and transmitting, to the base station during a second transmission time interval of the first bundle interval, a second repetition of the uplink channel in accordance with a second demodulation reference signal density configuration that differs from the first demodulation reference signal density configuration.

An apparatus for wireless communications at a UE is described. The apparatus may include a processor, memory coupled with the processor, and instructions stored in the memory. The instructions may be executable by the processor to cause the apparatus to identify a first demodulation reference signal density configuration and a second demodulation reference signal density configuration that differs from the first demodulation reference signal density configuration, receive, from a base station, a control message configuring the UE to transmit a set of multiple repetitions of an uplink channel over a set of multiple bundle intervals, transmit, to the base station during a first transmission time interval of a first bundle interval of the set of multiple bundle intervals, a first repetition of the uplink channel in accordance with the first demodulation reference signal density configuration, and transmit, to the base station during a second transmission time interval of the first bundle interval, a second repetition of the uplink channel in accordance with the second demodulation reference signal density configuration.

Another apparatus for wireless communications at a UE is described. The apparatus may include means for receiving, from a base station, a control message configuring the UE to transmit a set of multiple repetitions of an uplink channel over a set of multiple bundle intervals, means for transmitting, to the base station during a first transmission time interval of a first bundle interval of the set of multiple bundle intervals, a first repetition of the uplink channel in accordance with a first demodulation reference signal density configuration, and means for transmitting, to the base station during a second transmission time interval of the first bundle interval, a second repetition of the uplink channel in accordance with a second demodulation reference signal density configuration that differs from the first demodulation reference signal density configuration.

A non-transitory computer-readable medium storing code for wireless communications at a UE is described. The code may include instructions executable by a processor to identify a first demodulation reference signal density configuration and a second demodulation reference signal density configuration that differs from the first demodulation reference signal density configuration, receive, from a base station, a control message configuring the UE to transmit a set of multiple repetitions of an uplink channel over a set of multiple bundle intervals, transmit, to the base station during a first transmission time interval of a first bundle interval of the set of multiple bundle intervals, a first repetition of the uplink channel in accordance with the first demodulation reference signal density configuration, and transmit, to the base station during a second transmission time interval of the first bundle interval, a second repetition of the uplink channel in accordance with the second demodulation reference signal density configuration.

In some examples of the method, apparatuses, and non-transitory computer-readable medium described herein, the identifying may include operations, features, means, or instructions for receiving, from the base station, control signaling indicating the first demodulation reference signal density configuration may have a first demodulation reference signal density for uplink channel repetition, the second demodulation reference signal density configuration may have a second demodulation reference signal density for uplink channel repetition, or both.

Some examples of the method, apparatuses, and non-transitory computer-readable medium described herein may further include operations, features, means, or instructions for receiving, from the base station, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals.

Some examples of the method, apparatuses, and non-transitory computer-readable medium described herein may further include operations, features, means, or instructions for transmitting, in accordance with the sequence, a first subset of the set of multiple repetitions of the uplink channel in accordance with the first demodulation reference signal density configuration and a second subset of the set of multiple repetitions of the uplink channel in accordance with the second demodulation reference signal density configuration.

Some examples of the method, apparatuses, and non-transitory computer-readable medium described herein may further include operations, features, means, or instructions for receiving, from the base station, the control signaling indicating the demodulation reference signal mapping pattern that indicates the sequence that alternates between the first demodulation reference signal density configuration and the second demodulation reference signal density configuration over the set of multiple transmission time intervals.

Some examples of the method, apparatuses, and non-transitory computer-readable medium described herein may further include operations, features, means, or instructions for receiving, from the base station, the control signaling indicating the demodulation reference signal mapping pattern that indicates the sequence that alternates between a single instance of the first demodulation reference signal density configuration and a set of multiple instances of the second demodulation reference signal density configuration over the set of multiple transmission time intervals.

Some examples of the method, apparatuses, and non-transitory computer-readable medium described herein may further include operations, features, means, or instructions for receiving, from the base station, the control signaling indicating to restart the sequence at each boundary between consecutive pairs of bundle intervals of the set of multiple bundle intervals.

Some examples of the method, apparatuses, and non-transitory computer-readable medium described herein may further include operations, features, means, or instructions for receiving, from the base station, the control signaling indicating to restart the sequence each time a phase continuity rule may be not satisfied between a consecutive pair of uplink symbol periods within a same bundling interval of the set of multiple bundle intervals.

Some examples of the method, apparatuses, and non-transitory computer-readable medium described herein may further include operations, features, means, or instructions for receiving, from the base station, the control signaling indicating the demodulation reference signal mapping pattern that indicates the sequence corresponds to the set of multiple transmission time intervals that satisfy a phase continuity rule.

Some examples of the method, apparatuses, and non-transitory computer-readable medium described herein may further include operations, features, means, or instructions for transmitting the first repetition of the uplink channel includes transmitting a first repetition of an uplink message on the uplink channel and transmitting the second repetition of the uplink channel includes transmitting a second repetition of the uplink message on the uplink channel.

In some examples of the method, apparatuses, and non-transitory computer-readable medium described herein, receiving the control message may include operations, features, means, or instructions for receiving the control message that includes an indication of a bundle size indicating a number of consecutive transmission time intervals in each bundle interval of the set of multiple bundle intervals.

In some examples of the method, apparatuses, and non-transitory computer-readable medium described herein, receiving the control message may include operations, features, means, or instructions for receiving the control message that includes an indication of a transmission time interval structure format indicating a pattern of one or more uplink transmission time intervals and one or more downlink transmission time intervals over a set of multiple transmission time intervals.

In some examples of the method, apparatuses, and non-transitory computer-readable medium described herein, the uplink channel includes a physical uplink control channel.

In some examples of the method, apparatuses, and non-transitory computer-readable medium described herein, the uplink channel includes a physical uplink shared channel.

In some examples of the method, apparatuses, and non-transitory computer-readable medium described herein, the second demodulation reference signal density configuration indicates that a repetition of the uplink channel may be to be transmitted without any demodulation reference signals.

In some examples of the method, apparatuses, and non-transitory computer-readable medium described herein, the second demodulation reference signal density configuration indicates that a repetition of the uplink channel may be to be transmitted with a reduced number of demodulation reference signals as compared to the first demodulation reference signal density configuration.

A method for wireless communications at a base station is described. The method may transmitting, to a UE, a control message configuring the UE to transmit a set of multiple repetitions of an uplink channel over a set of multiple bundle intervals, receiving, from the UE during a first transmission time interval of a first bundle interval of the set of multiple bundle intervals, a first repetition of the uplink channel in accordance with a first demodulation reference signal density configuration, and receiving, from the UE during a second transmission time interval of the first bundle interval, a second repetition of the uplink channel in accordance with a second demodulation reference signal density configuration that differs from the first demodulation reference signal density configuration.

An apparatus for wireless communications at a base station is described. The apparatus may include a processor, memory coupled with the processor, and instructions stored in the memory. The instructions may be executable by the processor to cause the apparatus to identify a first demodulation reference signal density configuration and a second demodulation reference signal density configuration that differs from the first demodulation reference signal density configuration, transmit, to a UE, a control message configuring the UE to transmit a set of multiple repetitions of an uplink channel over a set of multiple bundle intervals, receive, from the UE during a first transmission time interval of a first bundle interval of the set of multiple bundle intervals, a first repetition of the uplink channel in accordance with the first demodulation reference signal density configuration, and receive, from the UE during a second transmission time interval of the first bundle interval, a second repetition of the uplink channel in accordance with the second demodulation reference signal density configuration.

Another apparatus for wireless communications at a base station is described. The apparatus may include means for transmitting, to a UE, a control message configuring the UE to transmit a set of multiple repetitions of an uplink channel over a set of multiple bundle intervals, means for receiving, from the UE during a first transmission time interval of a first bundle interval of the set of multiple bundle intervals, a first repetition of the uplink channel in accordance with a first demodulation reference signal density configuration, and means for receiving, from the UE during a second transmission time interval of the first bundle interval, a second repetition of the uplink channel in accordance with a second demodulation reference signal density configuration that differs from the first demodulation reference signal density configuration.

A non-transitory computer-readable medium storing code for wireless communications at a base station is described. The code may include instructions executable by a processor to identify a first demodulation reference signal density configuration and a second demodulation reference signal density configuration that differs from the first demodulation reference signal density configuration, transmit, to a UE, a control message configuring the UE to transmit a set of multiple repetitions of an uplink channel over a set of multiple bundle intervals, receive, from the UE during a first transmission time interval of a first bundle interval of the set of multiple bundle intervals, a first repetition of the uplink channel in accordance with the first demodulation reference signal density configuration, and receive, from the UE during a second transmission time interval of the first bundle interval, a second repetition of the uplink channel in accordance with the second demodulation reference signal density configuration.

Some examples of the method, apparatuses, and non-transitory computer-readable medium described herein may further include operations, features, means, or instructions for transmitting, to the UE, control signaling indicating the first demodulation reference signal density configuration may have a first demodulation reference signal density for uplink channel repetition, the second demodulation reference signal density configuration may have a second demodulation reference signal density for uplink channel repetition, or both.

Some examples of the method, apparatuses, and non-transitory computer-readable medium described herein may further include operations, features, means, or instructions for transmitting, to the UE, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals.

Some examples of the method, apparatuses, and non-transitory computer-readable medium described herein may further include operations, features, means, or instructions for receiving, in accordance with the sequence, a first subset of the set of multiple repetitions of the uplink channel in accordance with the first demodulation reference signal density configuration and a second subset of the set of multiple repetitions of the uplink channel having the second demodulation reference signal density configuration.

Some examples of the method, apparatuses, and non-transitory computer-readable medium described herein may further include operations, features, means, or instructions for transmitting, to the UE, the control signaling indicating the demodulation reference signal mapping pattern that indicates the sequence that alternates between the first demodulation reference signal density configuration and the second demodulation reference signal density configuration over the set of multiple transmission time intervals.

Some examples of the method, apparatuses, and non-transitory computer-readable medium described herein may further include operations, features, means, or instructions for transmitting to the UE, the control signaling indicating the demodulation reference signal mapping pattern that indicates the sequence that alternates between a single instance of the first demodulation reference signal density configuration and a set of multiple instances of the second demodulation reference signal density configuration over the set of multiple transmission time intervals.

Some examples of the method, apparatuses, and non-transitory computer-readable medium described herein may further include operations, features, means, or instructions for transmitting to the UE, the control signaling indicating to restart the sequence at each boundary between consecutive pairs of bundle intervals of the set of multiple bundle intervals.

Some examples of the method, apparatuses, and non-transitory computer-readable medium described herein may further include operations, features, means, or instructions for transmitting to the UE, the control signaling indicating to restart the sequence each time a phase continuity rule may be not satisfied between a consecutive pair of uplink symbol periods within a same bundling interval of the set of multiple bundle intervals.

Some examples of the method, apparatuses, and non-transitory computer-readable medium described herein may further include operations, features, means, or instructions for transmitting to the UE, the control signaling indicating the demodulation reference signal mapping pattern that indicates the sequence corresponds to the set of multiple transmission time intervals that satisfy a phase continuity rule.

Some examples of the method, apparatuses, and non-transitory computer-readable medium described herein may further include operations, features, means, or instructions for receiving the first repetition of the uplink channel includes receiving a first repetition of an uplink message on the uplink channel and receiving the second repetition of the uplink channel includes receiving a second repetition of the uplink message on the uplink channel.

In some examples of the method, apparatuses, and non-transitory computer-readable medium described herein, transmitting the control message may include operations, features, means, or instructions for transmitting, the control message that includes an indication of a bundle size indicating a number of consecutive transmission time intervals in each bundle interval of the set of multiple bundle intervals.

In some examples of the method, apparatuses, and non-transitory computer-readable medium described herein, the uplink channel includes a physical uplink control channel.

In some examples of the method, apparatuses, and non-transitory computer-readable medium described herein, the uplink channel includes a physical uplink shared channel.

In some examples of the method, apparatuses, and non-transitory computer-readable medium described herein, the second demodulation reference signal density configuration indicates that a repetition of the uplink channel may be to be transmitted without any demodulation reference signals.

In some examples of the method, apparatuses, and non-transitory computer-readable medium described herein, the second demodulation reference signal density configuration indicates that a repetition of the uplink channel may be to be transmitted with a reduced number of demodulation reference signals as compared to the first demodulation reference signal density configuration.

BRIEF DESCRIPTION OF THE DRAWINGS

FIG. 3 illustrates an example of a DMRS bundling scheme in accordance with aspects of the present disclosure.

DETAILED DESCRIPTION

Figure 1:
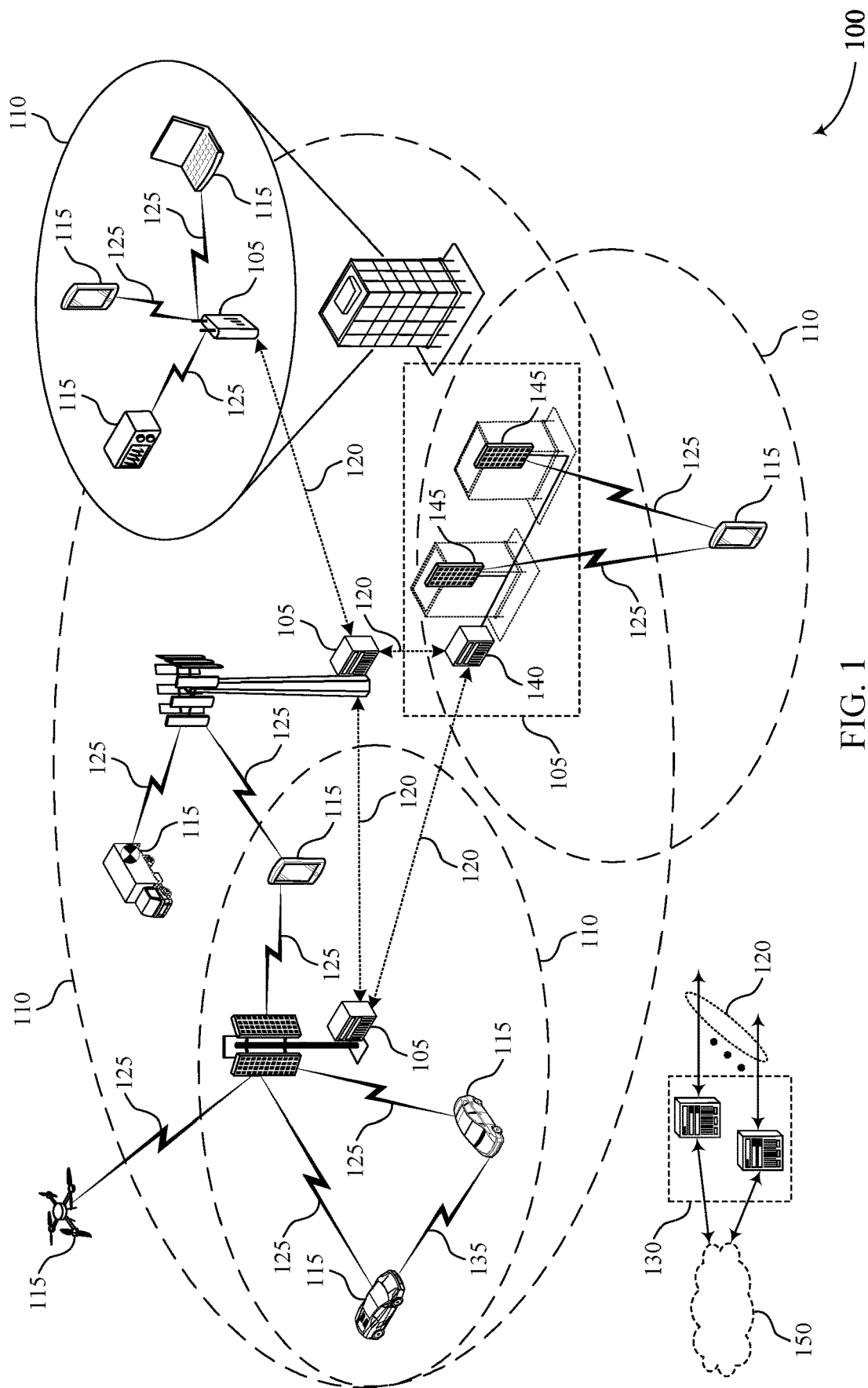
FIG. 1 illustrates an example of a wireless communications system that supports demodulation reference signal (DMRS) enhancement and bundling on physical channels in accordance with aspects of the present disclosure.

Some wireless communications systems may bundle demodulation reference signals (DMRSs) in order to improve channel estimation and improve a reliability of wireless communications. For example, some user equipments (UEs) may transmit DMRSs having phase continuity across multiple slots in conjunction with bundled uplink transmissions (e.g., physical uplink shared channel (PUSCH) repetitions or physical uplink control channel (PUCCH) repetitions) to enable the base station to aggregate the DMRSs, perform more accurate channel estimation, and demodulate the uplink channel transmissions. In some cases, DMRSs having phase-continuity across multiple slots and/or multiple transmissions may be said to be "bundled" across the multiple slots and/or multiple transmissions. Bundling one or more respective sets of uplink transmissions (e.g., PUSCH repetitions or PUCCH repetitions) may support joint processing of DMRSs at a base station. The network may define a bundle interval size (e.g., a number of transmission time intervals (TTIs)) for maintaining phase continuity across a respective set of repetitions, where each repetition in a bundle interval may be transmitted with phase continuity. In some legacy systems, a UE may transmit one or more DMRSs in each slot of an uplink channel, which the receiving base station may utilize for decode repetitions of uplink channel. However, in some examples, a base station may be capable of decoding some repetitions transmitted in different TTIs (e.g., slots) with less DMRSs than other slots, or no DMRSs (e.g., if channel conditions are the same across the different TTIs). Conventional wireless communications systems may not support DMRS bundling for PUSCH repetitions or PUCCH repetitions in a set of bundle intervals.

A base station may configure a UE to perform DMRS enhancements (e.g., DMRS optimization procedures) whereby the UE may transmit PUSCH or PUCCH repetitions with different DMRS densities. For example, a first DMRS density configuration (e.g., a first DMRS density in time) may have a first number of DMRS symbols within a TTI, and a second DMRS density configuration (e.g., a second DMRS density in time) may have a second number of DMRS symbols within a TTI. The first DMRS density configuration may be denser in time than the second DMRS density configuration. For instance, the second DMRS density configuration may have fewer DMRS symbols than the first DMRS density configuration, or may have no DMRS symbols within the TTI. The UE may identify TTIs (e.g., slots) that satisfy one or more phase continuity rules, and may perform DMRS enhancement in the identified TTIs. In an example, the UE may transmit a first repetition of an uplink channel in a first TTI of a bundle interval using the first DMRS density, and may transmit a second repetition of the uplink channel in a second TTI of the bundle interval using the second DMRS density (e.g., less DMRSs or no DMRSs). When phase continuity between the TTIs apply, the receiver may demodulate the PUSCH or PUCCH repetitions in the different TTIs using a channel estimate obtained from the first TTI. In some examples, the UE may apply a DMRS mapping pattern to multiple TTIs. The DMRS mapping pattern may include a sequence of one or more instances of a first DMRS density configuration and one or more instances of a second DMRS density configuration to be applied across multiple TTIs. The UE may restart the sequence indicated in the DMRS mapping pattern at each bundle interval boundary or when consecutive uplink symbol periods within a same bundling interval do not satisfy a phase continuity condition.

Transmitting a first repetition of the uplink channel in accordance with a first demodulation reference signal density configuration and a second repetition of the uplink channel in accordance with a second demodulation reference signal density configuration that differs from the first demodulation reference signal density configuration may result in more efficient use of available system resources, improved reliability of uplink transmissions, decreased system latency, and improved user experience. Further, receiving, from the base station, control signaling indicating a first demodulation reference signal density for uplink channel repetition, a second demodulation reference signal density for uplink channel repetition, or both, may also, or further, result in more efficient use of computational resources, improved reliability of uplink transmissions, more efficient decoding of wireless signaling, decreased system latency, and improved user experience.

Aspects of the disclosure are initially described in the context of wireless communications systems. Aspects of the disclosure are further illustrated by and described with reference to resource allocations, DMRS bundling schemes, and DMRS enhancement schemes. Aspects of the disclosure are further illustrated by and described with reference to of the disclosure are further illustrated by and described with reference to apparatus diagrams, system diagrams, and flowcharts that relate to DMRS enhancement and bundling on physical channels.

FIG. 1 illustrates an example of a wireless communications system 100 that supports DMRS enhancement and bundling on physical channels in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UEs 115 and the base stations 105 of the wireless communications system 100 may be configured to support techniques for signaling and/or configuring phase-continuity conditions for maintaining phase-across DMRSs which are bundled across multiple slots. In particular, a UE 115 of the wireless communications system 100 may be configured with one or more phase-continuity conditions which define sets of one or more rules for whether phase-continuity is maintained (or not maintained) across DMRSs bundled across multiple slots.

A base station 105 may configure a UE 115 to perform DMRS enhancement whereby the UE 115 may transmit PUSCH or PUCCH repetitions of different DMRS densities. For example, a first DMRS density configuration may have a first or default DMRS pattern (e.g., a first number of DMRS symbols within a TTI) may be different than a second DMRS density configuration which may have a second DMRS pattern(e.g., a second number of DMRS symbols within a TTI that is less than the first number of DMRS symbols, or equal to zero DMRS symbols within the TTI). The UE 115 may identify TTIs (e.g., slots) that satisfy one or more phase continuity rules, and may perform DMRS enhancement in the identified TTIs. In an example, the UE 115 may transmit a first repetition of an uplink channel in a first TTI of a bundle interval using the first DMRS density, and may transmit a second repetition of the uplink channel in a second TTI of the bundle interval using the second DMRS density (e.g., less DMRSs or no DMRSs). When phase continuity between the TTIs apply, the receiver may demodulate the PUSCH or PUCCH repetitions in the different TTIs using a channel estimate obtained from the first TTI. In some examples, the UE 115 may apply a DMRS mapping pattern to multiple TTIs. The DMRS mapping pattern may include a sequence of one or more instances of a first DMRS density configuration and one or more instances of a second DMRS density configuration to be applied across multiple TTIs. The UE 115 may restart the sequence indicated in the DMRS mapping pattern at each bundle interval boundary or when consecutive uplink symbol periods within a same bundling interval do not satisfy a phase continuity condition.

In some examples, some channels may experience lower transmission rates or other communication quality bottlenecks. Such channels may include channels in a frequency range 1 (FR1) such as a PUSCH for eMBB (e.g., for FDD or for TDD with "DDDSU," "DDDSUDDSUU," or "DDDDDDDSUU" formats), a PUSCH for voice over IP (VoIP) (e.g., for FDD or for TDD with "DDDSU" or "DDDSUDDSUU" formats), a PUCCH format 3 with 11 bits, or a PUCCH format 3 with 22 bits, among other examples. Such channels may additionally, or alternatively, include channels in a frequency range 2 (FR2) (e.g., urban 28 GHz) such as a PUSCH for eMBB (e.g., for TDD with "DDDSU" or "DDSU" formats), a PUSCH for VoIP (e.g., for TDD with "DDDSU" or "DDSU" formats), a PUCCH format 3 with 11 bits, or a PUCCH format 3 with 22 bits, among other examples. As described herein, a "D" may represent a TTI configured for downlink transmissions in a TTI structure format, such as a TDD format, a "U" may represent an TTI configured for downlink transmissions in the TDD format, and an "S" may represent a flexible TTI in the TDD format (e.g., a TTI configured for downlink, uplink, or both). A TDD format, as described herein, may be an example of or represent a TDD TTI structure format pattern, which may include a pattern of "D," "U," and "S," TTIs for TDD transmissions.

In order to enhance or increase coverage for uplink shared channel and/or uplink control channel transmissions, a PUSCH repetition type (e.g., a type A) may have an increased number of repetitions (e.g., maximum number of repetitions) of a PUSCH transmission, where the number of repetitions may be counted on a basis of available uplink slots (e.g., based on a TDD TTI format). Signaling may also be configured to support PUSCH repetitions (e.g., Type A PUSCH repetitions) for a random access message 3 (msg3). Additionally, or alternatively, coverage may be increased by supporting transport block (TB) processing over a multi-slot PUSCH transmission, where a TB size (TBS) may be determined based on the multiple slots and may be transmitted over the multiple slots.

Figure 2:
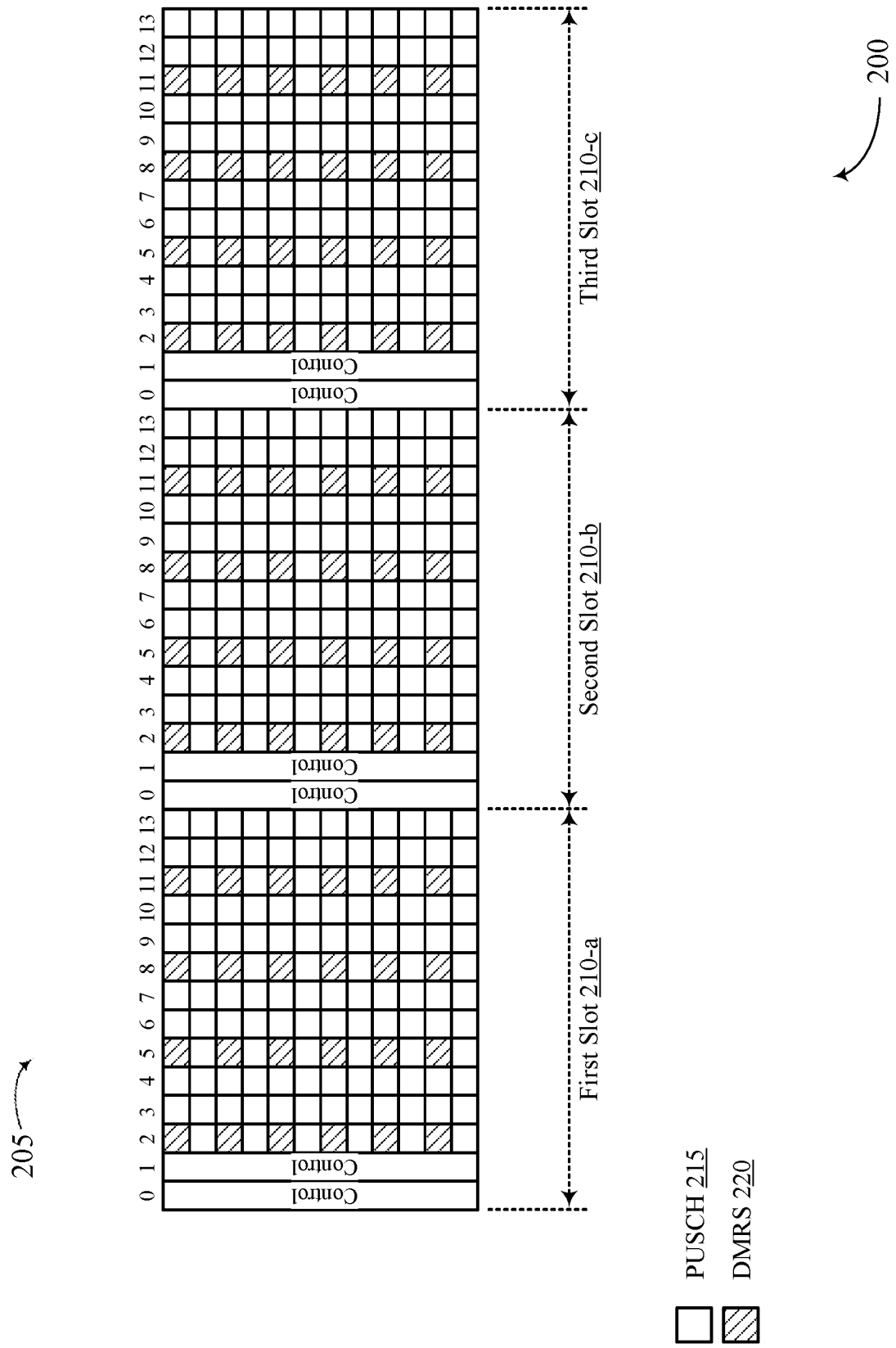
FIG. 2 illustrates an example of a resource configuration in accordance with aspects of the present disclosure.

FIG. 2 illustrates an example of a resource configuration 200 in accordance with aspects of the present disclosure. In some examples, resource configuration 200 may implement, or be implemented by, aspects of wireless communications system 100. The resource configuration 200 illustrates a set of resources 205 across multiple slots 210 which may be used for transmission/reception of phase-coherent DMRSs. Although illustrated with reference to a PUSCH 215, the techniques described with reference to FIG. 2 may also be implemented on a PUCCH.

A UE may transmit uplink data on a PUSCH 215 (or control information on a PUCCH). The UE may also transmit DMRSs 220, which may be mapped to resources within a slot 210. The base station may receive uplink transmissions (e.g., on PUSCH 215) and DMRSs. The base station may use the DMRSs to demodulate and decode the uplink transmissions. In some wireless communications systems (e.g., legacy communications systems), a base station may rely on the DMRSs 220 in a slot 210 to decode the uplink transmissions in that slot 210. That is, a base station may use the DMRSs 220 located in slot 210-*a* to decode the PUSCH 215 in slot 210-*a*, may use the DMRSs 220 located in slot 210-*b* to decode the PUSCH 215 in slot 210-*b*, and may use the DMRSs 220 located in slot 210-*c* to decode the PUSCH 215 in slot 210-*c*.

In some examples, some wireless communications systems (e.g., wireless communications system 100) may support jointly processing DMRSs 220 in multiple uplink transmissions (e.g., PUSCH transmissions or PUCCH transmissions). That is, if a wireless device (e.g., a UE 115) may maintain phase continuity from one slot to another slot. If a UE bundles DMRSs 220 located in different slots, but having phase continuity, then the base station may use the DMRSs of one slot 210 to decode uplink transmissions received in another bundled slot. Thus, by implementing techniques described herein, UEs 115 may transmit bundled DMRSs 220 having phase continuity (e.g., phase-coherent DMRSs 220) to improve channel estimation.

In some examples, resource configuration 200 may support uplink repetitions (e.g., PUCCH repetitions or PUSCH repetitions), which may enhance coverage. For example, a UE 115 may transmit one or more repetitions of an uplink channel (e.g., an uplink control message on a PUCCH or an uplink data message on a PUSCH). If each of slot 210-*a*, slot 210-*b*, and slot 210-*c* are allocated for uplink transmissions, UE 115 may transmit a first repetition of an uplink data message on PUSCH 215 in slot 210-*a*, a second repetition of the uplink data message on PUSCH 215 in slot 210-*b*, and a third repetition of the uplink data message on PUSCH 215 in slot 210-*c*.

In some wireless communications systems (e.g., wireless communications system 100), DMRSs 220 may be bundled across multiple slots, such that phase continuity may be maintained across multiple slots 210 and/or across the multiple transmissions. For example, in the wireless communications system 100, a UE 115 may be configured to transmit a DMRSs 220 within the first slot 210-*a*, the second slot 210-*b*, and the third slot 210-*c*, where phase continuity is maintained across each of the slots 210-*a*, 210-*b*, and 210-*c*. In this example, a base station 105 may be configured to jointly process (e.g., aggregate) the phase-coherent DMRSs 220 received across the slots 210-*a*, 210-*b*, and 210-*c* when performing channel estimation (e.g., cross-slot channel estimation), and may use a determined channel estimate to demodulate the PUSCH transmissions 215 received across the slots 210-*a*, 210-*b*, and 210-*c*.

In some examples, a UE 115 may be able to maintain phase continuity across first slot 210-*a*, second slot 210-*b*, and third slot 210-*c*. To maintain phase continuity, a UE 115 may satisfy one or more phase continuity rules. For instance, parameters that may be used for DMRSs 220 associated with one or more PUSCH transmissions 215 may include, but are not limited to, phase, frequency allocations, transmission powers, transmission relations, antenna ports used for transmission schemes, precoding schemes, or any combination thereof. For example, as illustrated in FIG. 2, in cases where DMRSs 220 are bundled across the first slot 210-*a*, the second slot 210-*b*, and the third slot 210-*c*, the frequency allocation and transmit power for the DMRSs 220 within each respective slot 210 may remain the same. Conversely, phase-continuity may not be maintained across slots 210 (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different transmission powers, or the like).

In cases where the UE 115 can maintain phase continuity across slot 210-*a*, slot 210-*b*, and slot 210-*c*, the UE 115 may perform DMRS enhancement procedures. For example, as described in greater detail with reference to FIG. 3, the UE may bundle one or more repetitions of uplink transmissions (e.g., PUCCH or PUSCH repetitions within a slot or across one or more slots). If the UE is capable of bundling repetitions of uplink transmissions, then the UE may perform DMRS enhancement, as described in greater detail with reference to FIGS. 5-7. For instance, instead of transmitting a same number of DMRSs in each slot 210, UE 115 may transmit some repetitions of uplink channels with a first DMRS density (e.g., a first number of DMRSs and mapping of the DMRSs), and may transmit other repetitions of the uplink channel using a second DMRS density that has less DMRSs or no DMRSs. For instance, UE 115 may transmit the first repetition of the uplink channel in slot 210-*a* using the first DMRS density, may transmit the second repetition of the uplink channel in slot 210-*b* using the second DMRS density (e.g., a reduced number of DMRSs or no DMRSs), and the third repetition of the uplink channel in slot 210-*c* using the first DMRS density. By mapping DMRSs to the slot using such DMRS enhancement schemes, UE 115 may more efficiently use available resources without decreasing the likelihood that base station 105 cannot successfully decode the uplink channel. For example, base station 105 may receive one or more of the repetitions, and may use the DMRSs included in first slot 210-*a* and third slot 210-*c* to decode the uplink transmission received during second slot 210-*b*.

Figure 3:
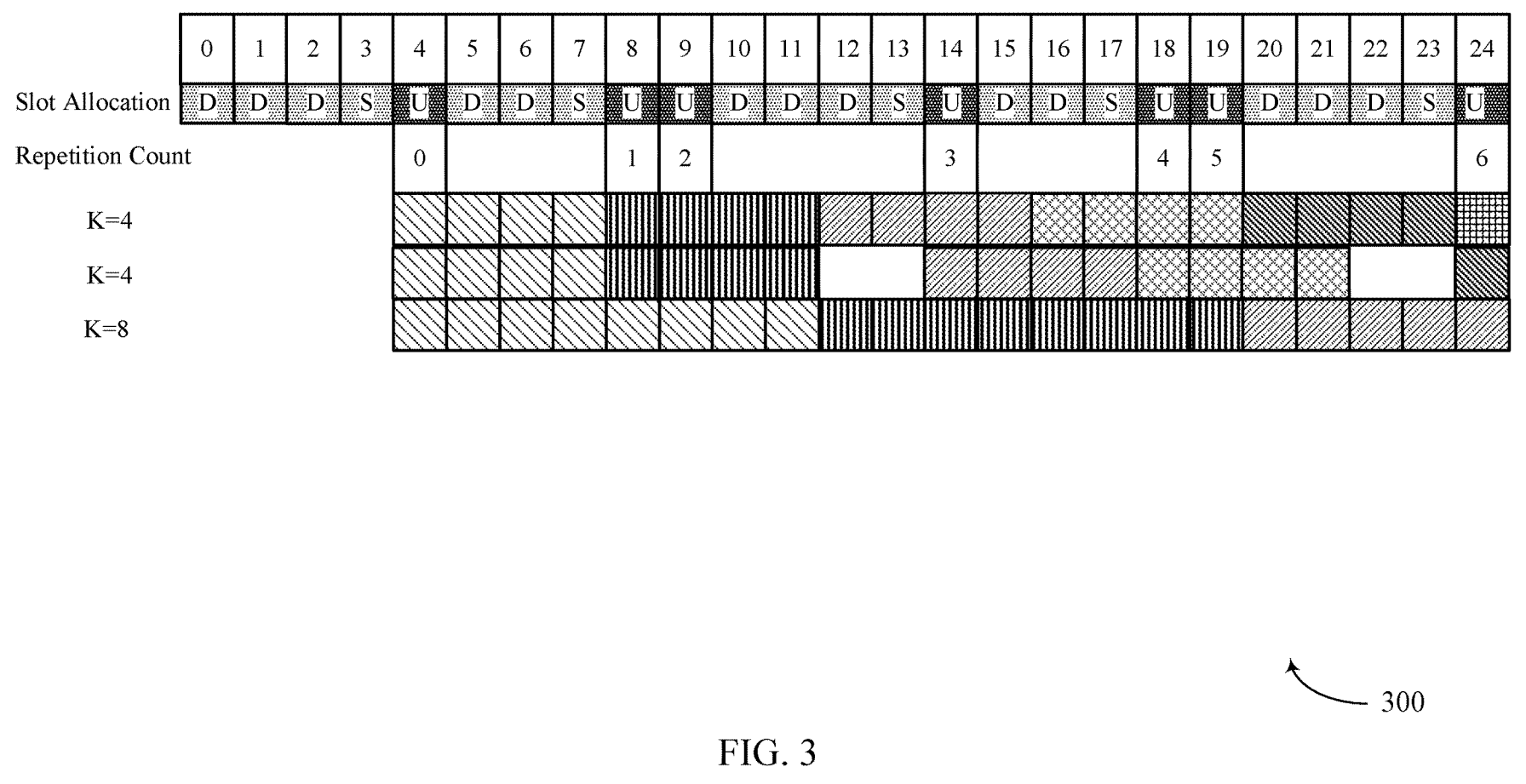

FIG. 3 illustrates an example of a DMRS bundling scheme 300 in accordance with aspects of the present disclosure. DMRS bundling scheme 300 may implement, or may be implemented by, a UE and a base station, which may be examples of corresponding devices described with reference to FIGS. 1 and 2.

In some examples, a base station may configure the UE with one or more bundle intervals (K). A bundle interval may be defined such that a UE may coherently transmit one or more uplink repetitions within the bundle interval subject to one or more phase continuity conditions. That is, if the one or more phase continuity conditions are satisfied within a bundle interval, the UE may transmit uplink signaling on physical uplink channels (e.g., PUCCH transmissions or PUSCH transmissions) while maintaining phase continuity within a bundle. The base station may configure bundle intervals at a UE via higher layer signaling (e.g., radio resource control (RRC) signaling), dynamic signaling (e.g., downlink control information (DCI) signaling), or the UE may implicitly determine the bundle intervals based on uplink repetition transmissions configurations. Each bundle interval may be the same size (e.g., have the same value for K).

The base station may also configure the UE with resource allocation information. For example, the UE may be configured with a time-division multiplexing (TDM) configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDD-SUDDSUU. Such a pattern may repeat itself over time (e.g., across various TTIs).

A UE may perform uplink repetitions (e.g., PUCCH repetitions or PUSCH repetitions) in available U TTIs. For instance, the UE may transmit repetition zero (e.g., an initial uplink transmission) in slot 4, repetition 1 in slot 8, repetition 2 in slot 9, repetition 3 in slot 14, repetition 18 in slot 4, repetition 5 in slot 19, repetition 6 in slot 24, etc.

In some examples, the base station may configure the UE with a bundle interval of K=4. The bundle interval may indicate four consecutive TTIs (e.g., slots), and each bundle interval may also be consecutive (e.g., a second bundle begins at the first TTI after a previous bundle ends). For instance, a first bundle interval may begin in slot 4, and may span slots 4 through 7. A second bundle interval may begin in the next slot (e.g., slot 8), and may span slots 8-11, etc. In some examples, a next bundle interval may begin at a next available TTI (e.g., a next U TTI or a next S TTI). For example, a first bundle interval may begin in slot 4, and may span slots 4 through 7. The next available U slot may be slot 8, so the next bundle interval may start at slot 8 and span slots 8-11. The next available U slot may be slot 14. So, the next bundle interval may start at slot 14 (e.g., instead of slot 12), and may span slots 14-17. In some examples, the base station may configure the UE with a bundle interval of K=8. In such examples, a first bundle interval may start in slot 4, and may span slots 4-11. A next bundle interval may begin at slot 12 and span slots 12-19, etc.

In some examples, a UE may perform DMRS enhancement of DMRS location/granularity in the time domain. For example, uplink transmissions in one slot may have different DMRS density (e.g., a different number of DMRS symbols in the slot) than uplink transmission in other slots. Or, uplink transmission in some slots may not include any DMRSs while uplink transmission in other slots have some DMRSs. In some examples, the UE may bundle some transmissions within a bundle interval, and may perform DMRS enhancement on the bundled transmissions. The UE may refrain from bundling other transmissions within a same bundle interval (e.g., if the other transmissions do not satisfy one or more phase continuity rules). For example, where K=8, the UE may bundle uplink transmissions for slot 8 and slot 9 within a first bundle interval spanning slots 4-11, but may refrain from bundling a transmission in slot 4 with a transmission in slot 8, as described in greater detail with reference to FIG. 4.

Figure 4:
FIG. 4 illustrates an example of a DMRS enhancement scheme in accordance with aspects of the present disclosure.

FIG. 4 illustrates an example of a DMRS enhancement scheme 400 in accordance with aspects of the present disclosure. In some examples, DMRS enhancement scheme 400 may implement, or be implemented by, aspects of wireless communications system 100, resource configuration 200, DMRS bundling scheme 300, or any combination thereof. As noted herein, bundling DMRSs having phase continuity across one or more slots may enable a receiving device to aggregate the bundled DMRSs and perform more accurate channel estimation, which may improve demodulation of received transmissions.

In some examples, a UE and a base station may perform DMRS enhancement procedures on slots (e.g., within a bundle interval) where phase continuity can be maintained. For example, as described with reference to FIG. 3, a base station may configure a UE with a bundle interval (e.g., K=8), which may indicate a bundle size (e.g., a number of consecutive TTIs in which a UE may transmit uplink signaling while maintaining phase continuity, subject to one or more phase continuity rules. The UE may transmit uplink channels (e.g., repetitions of PUCCH transmissions or PUSCH transmissions) during available U slots. For instance, a first bundle interval may start in slot 4, and may span slots 4 through 11 A UE may transmit repetitions of an uplink channel on a physical uplink channel (e.g., a PUCCH or a PUSCH) during U slot 4, U slot 8, and U slot 9 of the bundle interval. However, in some examples, some TTIs within a bundle may not satisfy one or more phase continuity rules. For instance, slot 4 and slot 8 may be separated by two D slots and a S slot (e.g., that is not designated for uplink transmissions). Because of the time difference between slot 4 and slot 8, or because of a transmit power difference, resource allocation difference, or the like, between slot 4 and slot 8, the UE may not be able to maintain phase continuity between slot 4 and slot 8. However, the UE may be able to maintain phase continuity across slots 8 and 9. That is, the UE may be able to transmit repetitions of an uplink channel on an uplink channel in slot 8 and slot 9, while maintaining a same transmit power, same spatial transmit relation, using same antenna ports, using a same precoding, or using the same frequency resource allocation. In such examples, the UE may refrain from bundling transmissions across slot 4 and slot 8, but may bundle transmissions for slot 8 and slot 9.

The UE may perform DMRS enhancement to bundles within a bundle interval that satisfy one or more phase continuity rules. Thus, the UE may perform DMRS enhancement to bundle 405. In such examples, the UE may use a different DMRS pattern for slot 8 than for slot 9. For instance, the UE may perform uplink transmissions on an uplink channel and may map DMRSs to resources within slot 8 using a first DMRS density configuration (e.g., a first density of DMRS symbols in time), and may perform uplink transmissions on the same uplink channel and may map DMRSs to resources within slot 9 using a second MRS density configuration (e.g., a second density of DMRS symbols in time). In such examples, the UE may transmit less DMRSs or no DMRSs in slot 9 (e.g., slot 9 may include less DMRS symbols than slot 8, or no DMRS symbols). The UE may then transmit a first repetition of an uplink channel (e.g., a first PUCCH repetition or a first PUSCH repetition) in accordance with the first DMRS density configuration in slot 8, and may transmit a second repetition of the uplink channel (e.g., a second PUCCH repetition or a second PUSCH repetition) in accordance with the second DMRS density configuration in slot 9.

In some examples, the base station may indicate (e.g., via control signaling), a DMRS mapping pattern to the UE for DMRS enhancement. The DMRS mapping pattern may include a sequence of the first DMRS density configuration and the second DMRS density configuration (e.g., a number of consecutive slots in which to apply the first DMRS density configuration and a number of consecutive slots in which to apply the second DMRS density configuration). For instance, the DMRS mapping pattern may include a single instance of the first DMRS density configuration followed by a second DMRS density configuration. The UE may apply the indicated DMRS mapping pattern to bundled slots (e.g., slot 8 and slot 9 of bundle 405), and may transmit uplink repetitions and DMRSs in accordance with the pattern. However, the UE may not bundle U slots of a bundle interval that cannot be bundled without violating one or more phase continuity rules. For instance, slot 4 and slot 8 may not satisfy the one or more phase continuity rules. A phase continuity rule may include a rule that phase continuity can only be maintained for slots that are located less than threshold number of TTIs apart. Or, as described herein, the UE may not be able to transmit uplink channels in slot 4 and slot 8 using the same uplink transmit power, or on the same frequency resources. Thus, because the UE cannot bundle slot 4 and slot 8, the UE may transmit a repetition of an uplink channel in slot 4 according to the first DMRS density configuration (e.g., instead of performing a DMRS enhancement operation for slot 4). The UE may not apply the DMRS mapping pattern to slots that cannot be bundled (e.g., slots 4).

In some examples, as described in greater detail with reference to FIG. 5, the UE may determine how to apply the pattern across bundle interval boundaries.

Figure 5:
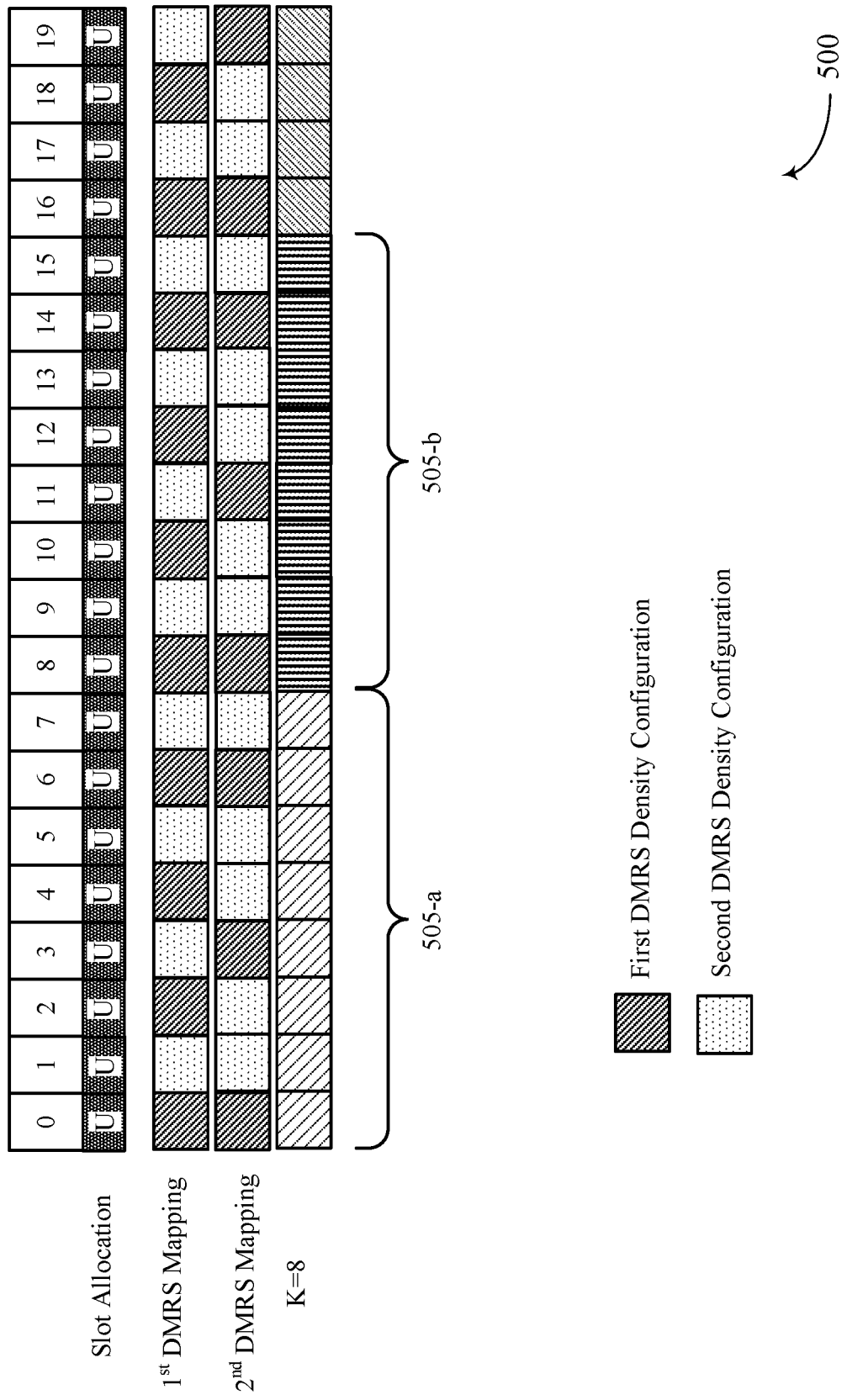
FIG. 5 illustrates an example of a DMRS enhancement scheme in accordance with aspects of the present disclosure.

FIG. 5 illustrates an example of a DMRS enhancement scheme 500 in accordance with aspects of the present disclosure. In some examples, DMRS enhancement scheme 500 may implement, or be implemented by, aspects of wireless communications system 100, resource configuration 200, DMRS bundling scheme 300, DMRS enhancement scheme 400, or any combination thereof. As noted herein, bundling DMRSs having phase continuity across one or more slots may enable a receiving device to aggregate the bundled DMRSs and perform more accurate channel estimation, which may improve demodulation of received channels.

In some examples, as described herein, a base station may configure one or more bundle intervals 505, having a bundle interval size (e.g., K=8). Bundle interval 505-*a* may start in slot 0 and span slots 0 through 7, and bundle interval 505-*b* may start at slot 8 and span slots 8 through 15, etc. A base station may also configure the UE with resource allocation information. For instance, the base station may provide TDM configuration information, as illustrated with reference to FIG. 4, and each slot may be allocated as a U slot, a D slot, or a S slot. In some examples, as illustrated with reference to FIG. 5, the base station may provide FDM configuration information. In such examples, each slot of a frequency band, subband, or the like, may be allocated for uplink transmissions. In sch examples, the UE may transmit uplink transmission, or repetitions of uplink transmissions, in any or each U slot. In such examples, any group of slots or sub-set of slots (e.g., pairs of slots) may be bundled in accordance with a configured DMRS mapping pattern.

In a first DMRS mapping example, the base station may indicate to the UE a two-slot mapping sequence for a first MRS density configuration and a second DMRS density configuration (e.g., where the second DMRS density configuration has less DMRSs than the first DMRS density configuration, or no DMRSs). After completing a DMRS mapping sequence, the UE may repeat the DMRS mapping sequence. Thus, the UE may alternate between mapping DMRSs according to the first DMRS configuration density configuration in a first slot (e.g., slot 0) and the second DMRS configuration density in a second slot (e.g., slot 1) according to a sequence indicated in the DMRS mapping pattern. The UE may then immediately repeat the sequence (e.g., mapping DMRSs according to the first DMRS configuration density in slot 2 and according to the second DMRS configuration density in slot 3). Having mapped the DMRSs according to the sequences indicated by the DMRS mapping patterns, the UE may transmit repetitions of uplink messages or multi-slot uplink messages (e.g., on a PUCCH or PUSCH) in accordance with the mapped DMRSs.

In a second DMRS mapping example, the base station may indicate to the UE a multi-slot mapping sequence (e.g., a three-slot mapping sequence) for the first DMRS density configuration and the second DMRS density configuration. The DMRS mapping pattern may indicate sequence of a first instance of the first DMRS density configuration in a first slot (e.g. slot 0), following by multiple instances (e.g., two) of the second DMRS density configuration in consecutive second and third slots (e.g., slot 1 and slot 2). In such examples, the UE may map DMRSs according to the first DMRS density configuration in slot 0, and may map DMRSs according to the second DMRS density configuration in slot 1 and slot 2. The UE may immediately repeat the pattern, mapping DMRSs according to the first DMRS configuration density in slot 3, and mapping DMRSs according to the second DMRS configuration density in slots 4 and 5. Having mapped the DMRSs according to the indicated sequences, the UE may transmit repetitions of uplink messages or multi-slot uplink messages (e.g., on a PUCCH or PUSCH) in accordance with the mapped DMRSs. As noted with reference to FIG. 4, the UE may only bundle slots that satisfy the one or more phase continuity rules, and may only apply the configured DMRS mapping patterns to slots that can be bundled.

In some examples, the UE may restart (e.g., reset) the mapping sequence at each bundle interval boundary. For example, in the second DMRS mapping example, the UE may be repeating the sequence indicated by the DMRS mapping pattern as instructed, and may map DMRSs in slot 6 according to the first DMRS density configuration. The DMRS mapping pattern may indicate a sequence such that the UE is to then map DMRSs in the next two consecutive slots (e.g., slots 7 and 8) according to the second DMRS density configuration. However, slot 7 may be the last slot of bundle interval 505-*a,* and slot 8 maybe the first slot of bundle interval 505-*b*. In such examples, instead of finishing a complete iteration of the sequence configured by the DMRS mapping pattern, the UE may restart the sequence in the first slot of the new bundle interval 505-*b* (e.g., slot 8), interrupting the previous iteration of the full sequence. Thus, the UE may map DMRSs during slot 8 of bundle interval 505-*b* according to the first DMRS density configuration, may map DMRSs during slot 9 of bundle interval 505-*b* according to the second DMRS density configuration, and may map DMRSs during slot 10 to bundle interval 505-*b* according to the second DMRS density configuration. The UE may then transmit repetitions of uplink channels according to the mapped DMRSs. The UE may similarly interrupt an uncompleted iteration of the DMRS mapping pattern for slot 16 (e.g., the first slot of a third bundle interval), and may restart the DMRS mapping pattern in slot 16.

In some examples, as described in greater detail with reference to FIG. 6, the UE may restart a DMRS mapping pattern for different bundles within a bundle interval.

Figure 6:
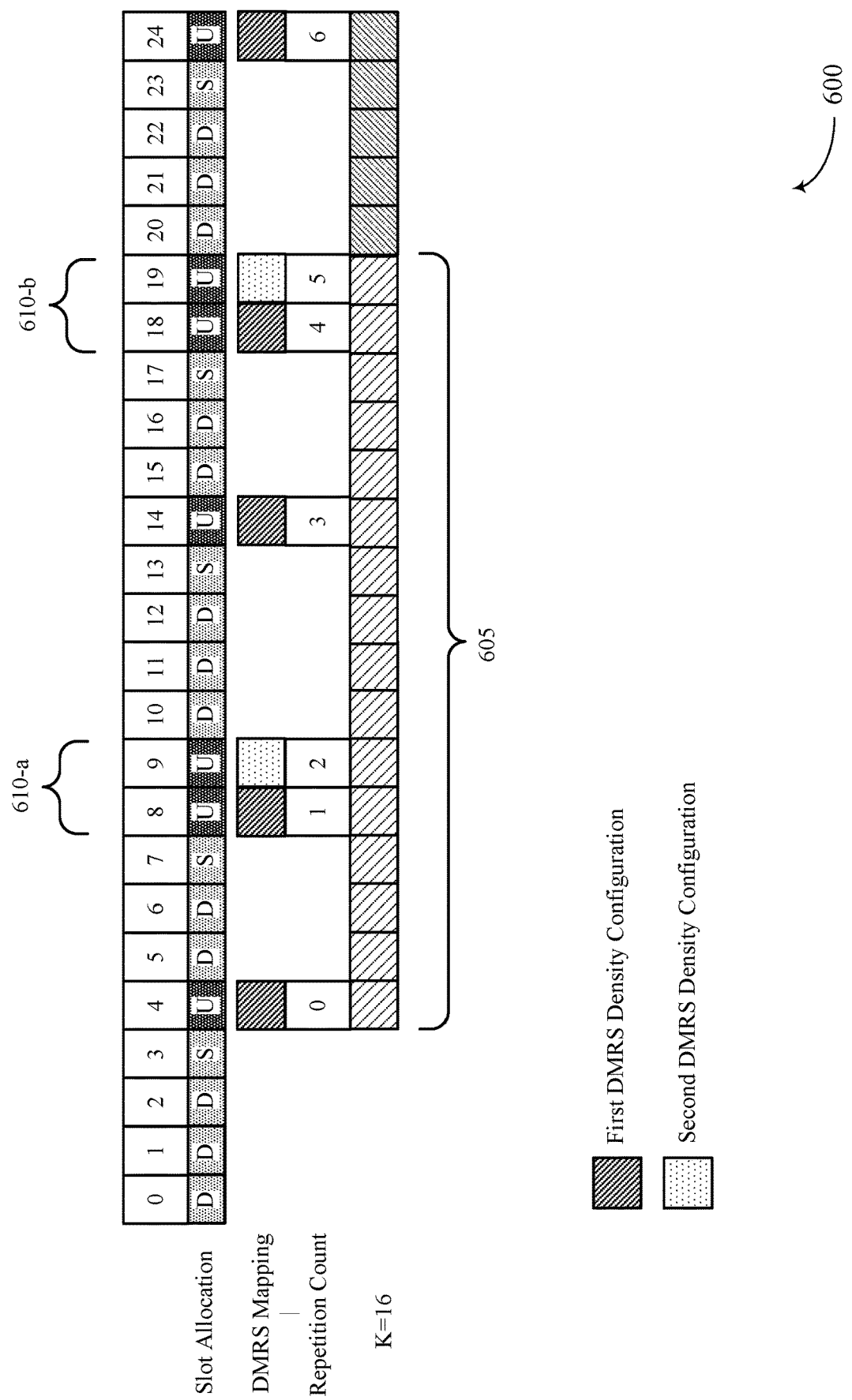
FIG. 6 illustrates an example of a DMRS enhancement scheme in accordance with aspects of the present disclosure.

FIG. 6 illustrates an example of a DMRS enhancement scheme 600 in accordance with aspects of the present disclosure. In some examples, DMRS enhancement scheme 600 may implement, or be implemented by, aspects of wireless communications system 100, resource configuration 200, DMRS bundling scheme 300, DMRS enhancement schemes 400 and 500, or any combination thereof. As noted herein, bundling DMRSs having phase continuity across one or more slots may enable a receiving device to aggregate the bundled DMRSs and perform more accurate channel estimation, which may improve demodulation of received transmissions. In some examples, a base station may configure the UE with a resource configuration (e.g., a TDM resource allocation), in which each slot is allocated as a D slot, a U slot, or an S slot. The UE may transmit uplink transmissions (e.g., uplink repetitions) during available U slots (e.g., slot 4, slot 8, slot 9, slot 14, slot 18, slot 19, slot 24, etc.).

In some examples, as described in greater detail with reference to FIGS. 4 and 5, a base station may configure a UE with bundle intervals spanning a number of slots (e.g., K=16, where each bundle interval spans 16 slots). Each bundle interval may define a number of consecutive slots in which a UE may be permitted to bundle one or more uplink transmissions on physical channels (e.g., within a slot or across multiple slots). The UE may bundle uplink transmission within or across slots within a bundle interval, where uplink transmission can be performed while maintaining phase continuity (e.g., satisfying one or more phase continuity rules). As described in greater detail with reference to FIGS. 4 and 5, the UE may apply a configured DMRS mapping patterns to slots within a bundle 610.

In some examples, the UE may restart (e.g., reset) a DMRS mapping pattern for each new bundle 610 (e.g., within a bundle interval 605). For example, as described with reference to FIG. 4, a UE may not be able to maintain phase continuity across slots 4 and 8 (e.g., as a result of D and S slots between slots 4 and 8). For example, the UE may transmit uplink messages during slot 4 and slot 8 using different transmit powers, on different frequency resources, using different antennas or antenna ports, with different spatial parameters, or different precoding. Thus, uplink transmission on physical channels in slots 4 and 8 may not satisfy one or more phase continuity rules. However, the UE may be able to bundle slot 8 and slot 9. That is, the UE may be able to send uplink transmission or repetitions of an uplink transmission on physical channels in slot 8 and not using a same transmit power, on the same frequency resources, using the same antennas or antenna ports, using the same spatial parameters, or using the same precoding, which may satisfy one or more phase continuity rules.

The base station may configure, as described in greater detail with reference to FIG. 5, a DMRS mapping pattern. The UE may apply the DMRS mapping pattern to bundles 610. In some examples, the UE may restart the DMRS mapping pattern for different bundles 610 within a same bundle interval 605. For instance, the DMRS mapping pattern may indicate a two-slot pattern, where the UE is instructed to map DMRSs using a first DMRS density configuration for a first slot of a bundle 610 (e.g., slot 8 of bundle 610-*a*), and to map DMRSs using a second DMRS density configuration (e.g., that has less DMRSs than the first DMRS density configuration or no DMRSs) to a next consecutive slot of a bundle (e.g., slot 9 of bundle 610-*a*). In such examples, the UE may apply the first DMRS density configuration to slot 8 and the second DMRS density configuration to slot 9. The UE may not bundle slots that cannot maintain phase continuity without violation one or more phase continuity rules. For example, slot 14 and slot 18 may be too far apart in time to satisfy a minimum timing threshold value, may be transmitted at different transmit powers, may be located in different frequency resources, may use different transmit antennas or antenna ports, or different spatial relations, or use different precoding. Thus, the UE may not perform DMRS enhancement procedures for slot 14 (e.g., may not apply the DMRS mapping pattern to slot 14), and may transmit a repetition of an uplink channel during slot 14 according to the first DMRS density configuration.

For bundle 610-*b,* the UE may apply the DMRS mapping pattern again, restarting with first slot 18 of bundle 610-*b,* and continuing the pattern accordingly. Even if a DMRS mapping pattern is not completed in a first bundle, the UE may restart the DMRS mapping pattern for a next bundle within a same bundle interval. For example, the DMRS mapping pattern may cover more than two slots (e.g., a three-slot DMRS mapping pattern as described with reference to FIG. 5). The UE may map DMRSs to slot 8 and slot 9 according to the first two slots of the DMRS mapping pattern. However, for slot 18 of bundle 610-*b,* instead of completing the three-slot DMRS mapping pattern started in bundle 610-*a,* the UE may restart the DMRS mapping pattern (e.g., mapping DMRSs to slot 18 according to the first DMRS density configuration).

Figure 7:
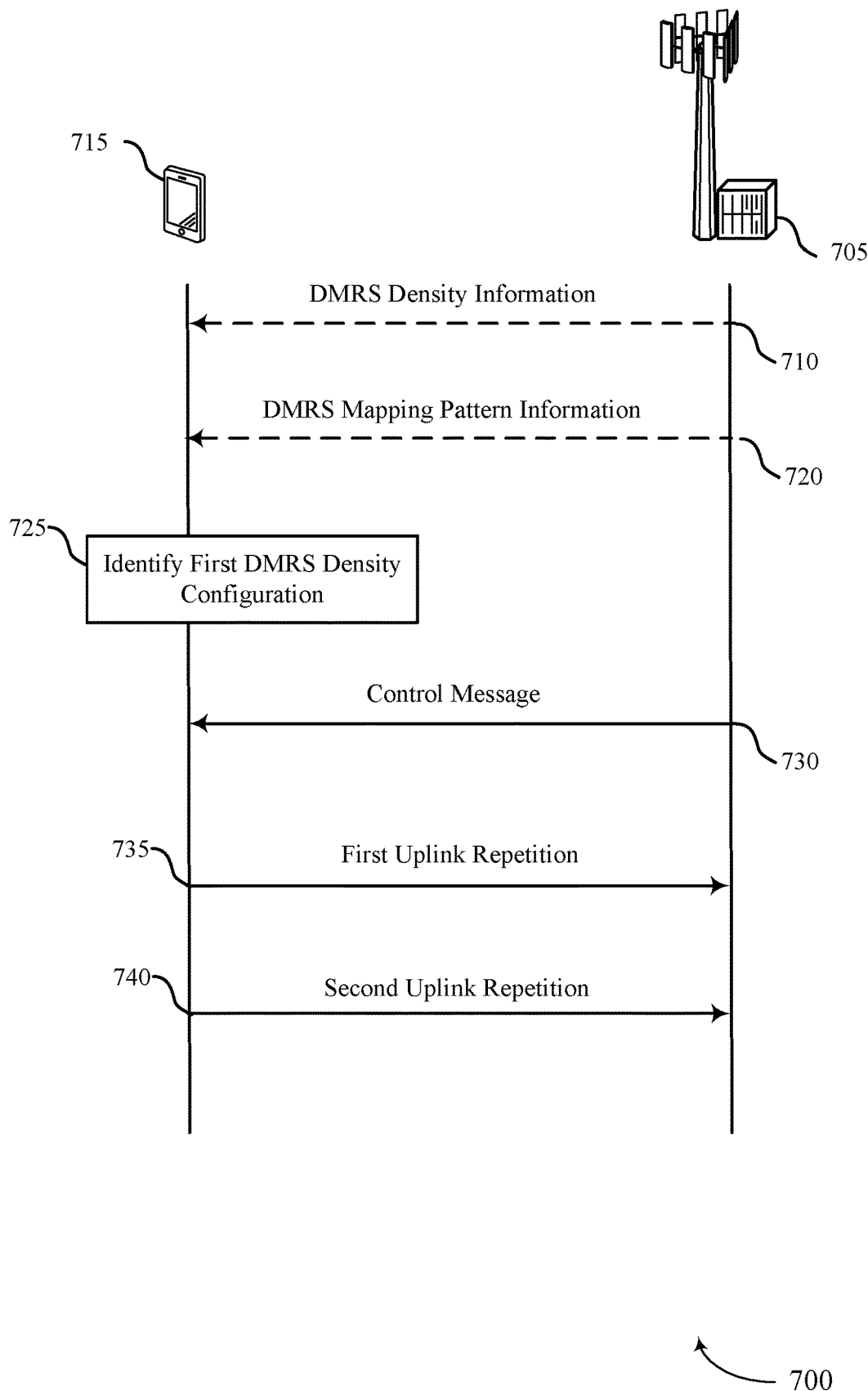
FIG. 7 illustrates an example of a process flow in accordance with aspects of the present disclosure.

FIG. 7 illustrates an example of a process flow 700 in accordance with aspects of the present disclosure. In some examples, process flow 700 may implement, or be implemented by, aspects of wireless communications system 100, resource configuration 200, DMRS bundling scheme 300, DMRS enhancement schemes 400, 500, or 600, or any combination thereof. Process flow 700 may include a base station 705 and a UE 715, which may be examples of corresponding devices described with reference to FIGS. 1-7.

At 725, UE 715 may identify a first DMRS density configuration and second DMRS density configuration that differs from the first DMRS configuration. For example, the second DMRS configuration may indicate that a repetition of an uplink channel is to be transmitted with a reduced number of DMRS compared to the first DMRS density configuration, or without any DMRSs. In some examples, the identifying may be based on receiving DMRS density information. For example, at 710, base station 705 may transmit, and UE 715 may receive, DMRS density information including control signaling (e.g., on a PDCCH) indicating the first DMRS configuration has a first DMRS density for uplink channel repetition, the second DMRS density configuration has a second DMRS density for uplink channel repetition, or both.

In some examples, base station 705 may transmit, and UE 715 may receive, a control message indicating a bundle size. The bundle size may indicate a number of TTIs in each bundle interval of the multiple bundle intervals. The bundle size indication may be included in the control message that indicates the DMRS density information, or a separate control message, or any combination thereof.

At 730, base station 705 may transmit, and UE 715 may receive, a control message. The control message may configure UE 715 to transmit multiple repetitions of an uplink channel (e.g., an uplink transmission on a PUCCH or PUSCH) over multiple bundle intervals. The control message may configure the transmission of the repetitions described with reference to FIGS. 3-6, during bundle intervals (e.g., bundle intervals as described with reference to FIG. 4, bundle intervals 505 as described with reference to FIG. 5, bundle intervals 605 as described with reference to FIG. 6, or the like. In some examples, the control message may include an indication of a TTI structure format (e.g., a TDM format as illustrated with reference to FIG. 4 and FIG. 6, or an FDM format as illustrated with reference to FIG. 5). The TTI structure format may indicate a pattern of one or more uplink TTIs and one or more downlink TTIs over multiple TTIs.

At 735, UE 715 may transmit, and base station 705 may receive, a first repetition of the uplink channel in accordance with the first DMRS density configuration. UE 715 may transmit the first repetition during a first TTI (e.g., slot) of a bundle interval of the multiple bundle intervals indicated at 730.

At 740, UE 715 may transmit a second uplink repetition of the uplink channel in accordance with the second DMRS density configuration. UE 715 may transmit the second repetition during a second TTI (e.g., slot) of the bundle interval of the multiple bundle intervals indicate at 730.

In some examples, base station 705 may transmit, and UE 715 may receive, an indication of a DMRS mapping pattern. At 720, base station 705 may transmit, to UE 715, DMRS mapping pattern information via control signaling. The DMRS mapping pattern information may indicate a DMRS mapping pattern that indicates a sequence in which to apply one or more instance of the first DMRS density configuration and one or more instances of the second DMRS density configuration over multiple TTIs. For instance, the DMRS mapping pattern may indicate a sequence that alternates between the first MRS density configuration and the second DMRS density configuration over the TTIs (e.g., as illustrated with reference to the first DMRS mapping example in FIG. 5). In some examples, the DMRS mapping pattern may indicate a sequence that alternates between a single instance of the first DMRS density configuration and multiple instances of the second DMRS density configuration over the TTIs (e.g., as illustrated with reference to the second DMRS mapping example in FIG. 5). In some examples, having received the DMRS mapping pattern information at 720, the UE may transmit a first subset of repetitions (e.g., including the first uplink repetition) of an uplink channel the at 735 using the first DMRS density configuration, in accordance with the DMRS mapping pattern, and may transmit a second subset of repetition (e.g., including the second repetition) of the uplink channel at 740 using the second DMRS density configuration, in accordance with the DMRS mapping pattern.

In some examples, base station 705 may transmit, and UE 715 may receive, control signaling indicating to restart the sequence at each boundary between consecutive pairs of bundle intervals of the multiple bundle intervals. The UE may restart the DMRS mapping pattern for each bundle interval, according to the control signaling, as illustrated with reference to FIG. 6. The control signaling and indication to restart the sequences may be included in the DMRS mapping pattern information, the DMRS density information, or a separate control message.

In some examples, base station 705 may transmit, and UE 715 may receive, control signaling indicating to restart the sequence for bundles within a bundle interval, or for any bundle that satisfies one or more phase continuity rules. For example, the control signaling may indicate the DMRS mapping pattern that satisfies one or more phase continuity rules. In some examples, the phase continuity rule may be specified in one or more standards, or may be otherwise known to both UE 715 and base station 705.

Figure 8:
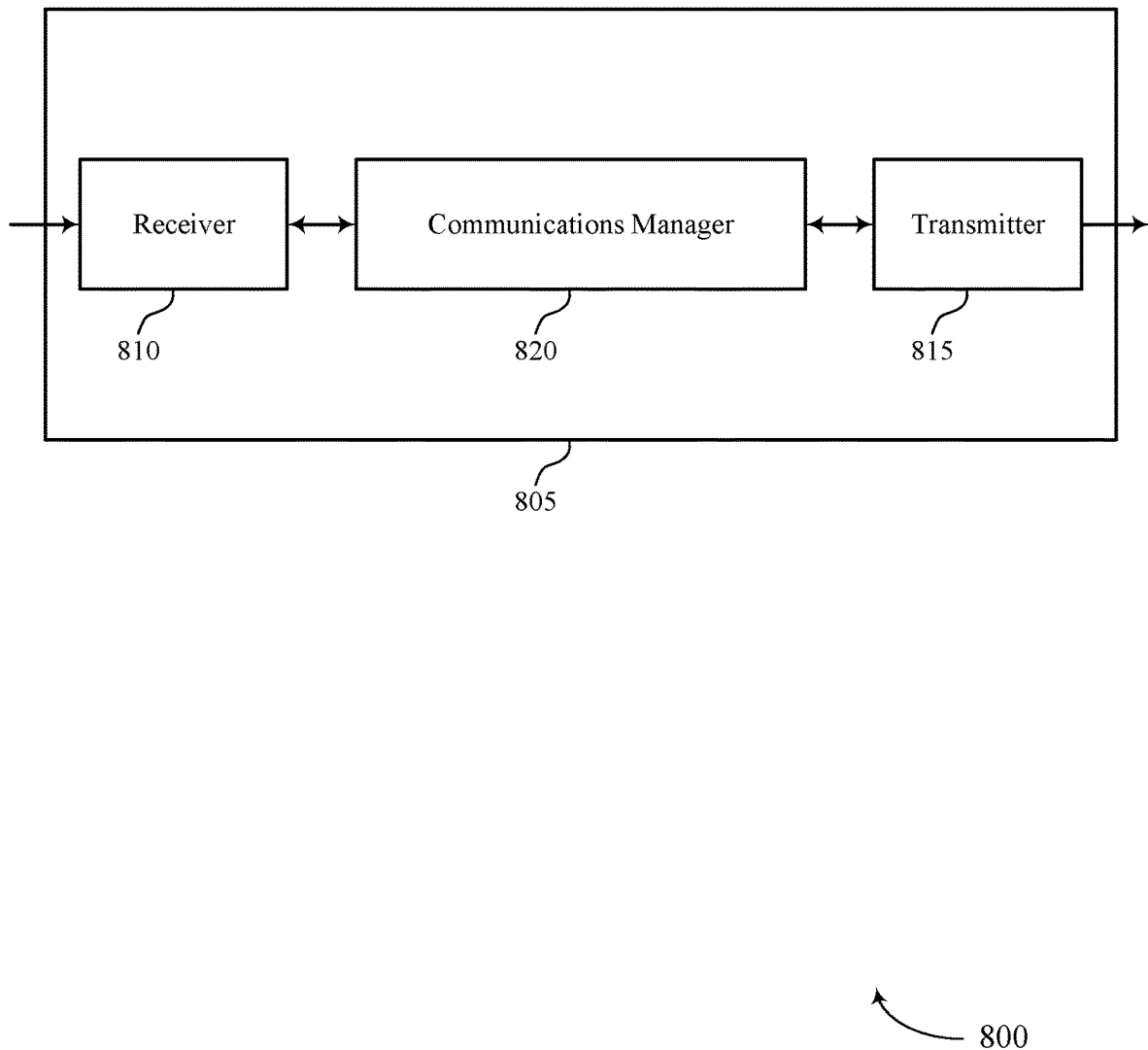
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to DMRS enhancement and bundling on physical channels). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DMRS enhancement and bundling on physical channels). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of DMRS enhancement and bundling on physical channels as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a control message configuring the UE to transmit a set of multiple repetitions of an uplink channel over a set of multiple bundle intervals. The communications manager 820 may be configured as or otherwise support a means for transmitting, to the base station during a first transmission time interval of a first bundle interval of the set of multiple bundle intervals, a first repetition of the uplink channel in accordance with a first demodulation reference signal density configuration. The communications manager 820 may be configured as or otherwise support a means for transmitting, to the base station during a second transmission time interval of the first bundle interval, a second repetition of the uplink channel in accordance with a second demodulation reference signal density configuration that differs from the first demodulation reference signal density configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for DMRS enhancement and bundling, which may result in more efficient use of available system resources, improved reliability of uplink transmissions, decreased system latency, and improved user experience.

Figure 9:
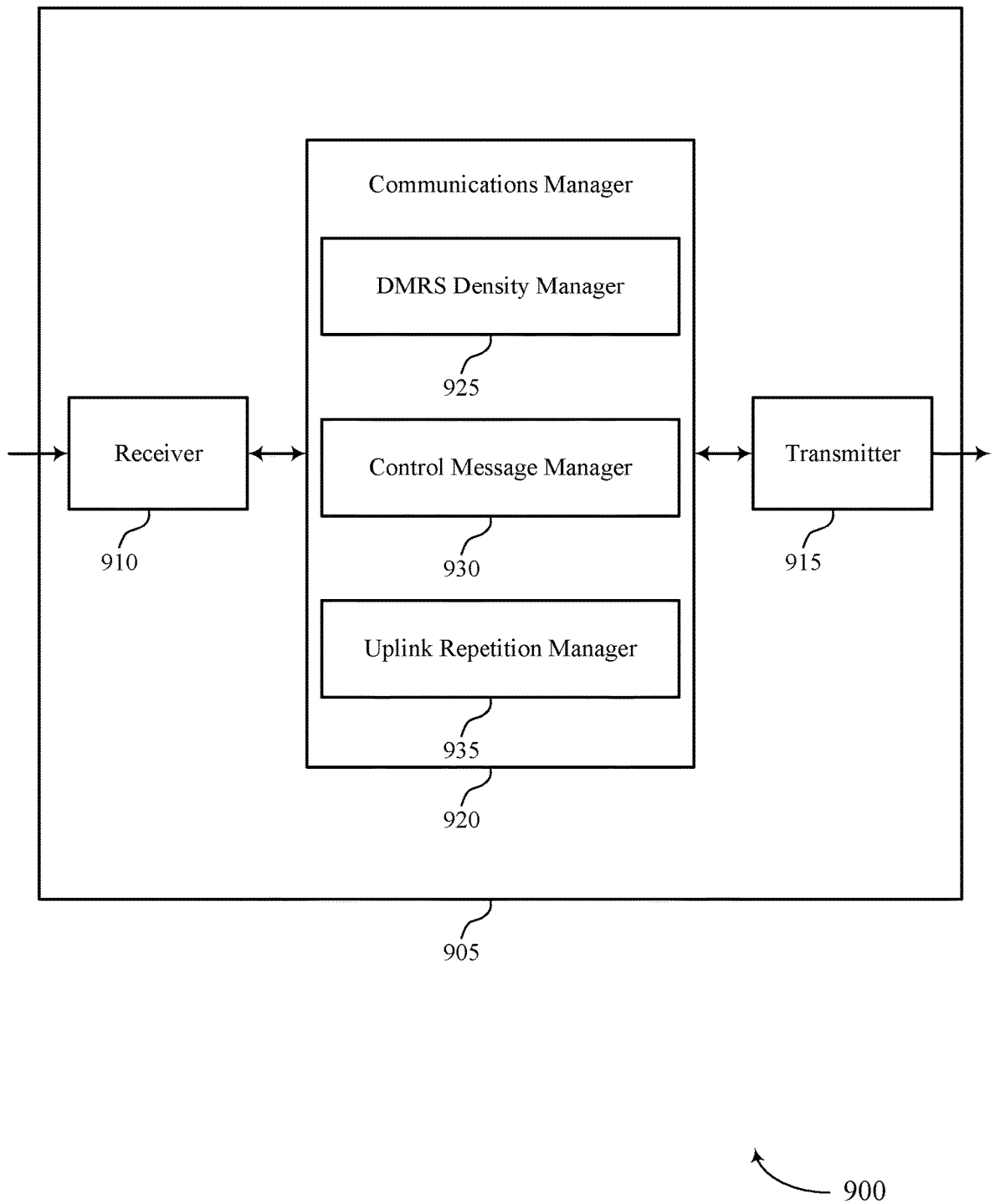

FIG. 9 shows a block diagram 900 of a device 905 in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to DMRS enhancement and bundling on physical channels). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to DMRS enhancement and bundling on physical channels). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of DMRS enhancement and bundling on physical channels as described herein. For example, the communications manager 920 may include a DMRS density manager 925, a control message manager 930, an uplink repetition manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The DMRS density manager 925 may be configured as or otherwise support a means for identifying a first demodulation reference signal density configuration and a second demodulation reference signal density configuration that differs from the first demodulation reference signal density configuration. The control message manager 930 may be configured as or otherwise support a means for receiving, from a base station, a control message configuring the UE to transmit a set of multiple repetitions of an uplink channel over a set of multiple bundle intervals. The uplink repetition manager 935 may be configured as or otherwise support a means for transmitting, to the base station during a first transmission time interval of a first bundle interval of the set of multiple bundle intervals, a first repetition of the uplink channel in accordance with a first demodulation reference signal density configuration. The uplink repetition manager 935 may be configured as or otherwise support a means for transmitting, to the base station during a second transmission time interval of the first bundle interval, a second repetition of the uplink channel in accordance with a second demodulation reference signal density configuration that differs from the first demodulation reference signal density configuration.

Figure 10:
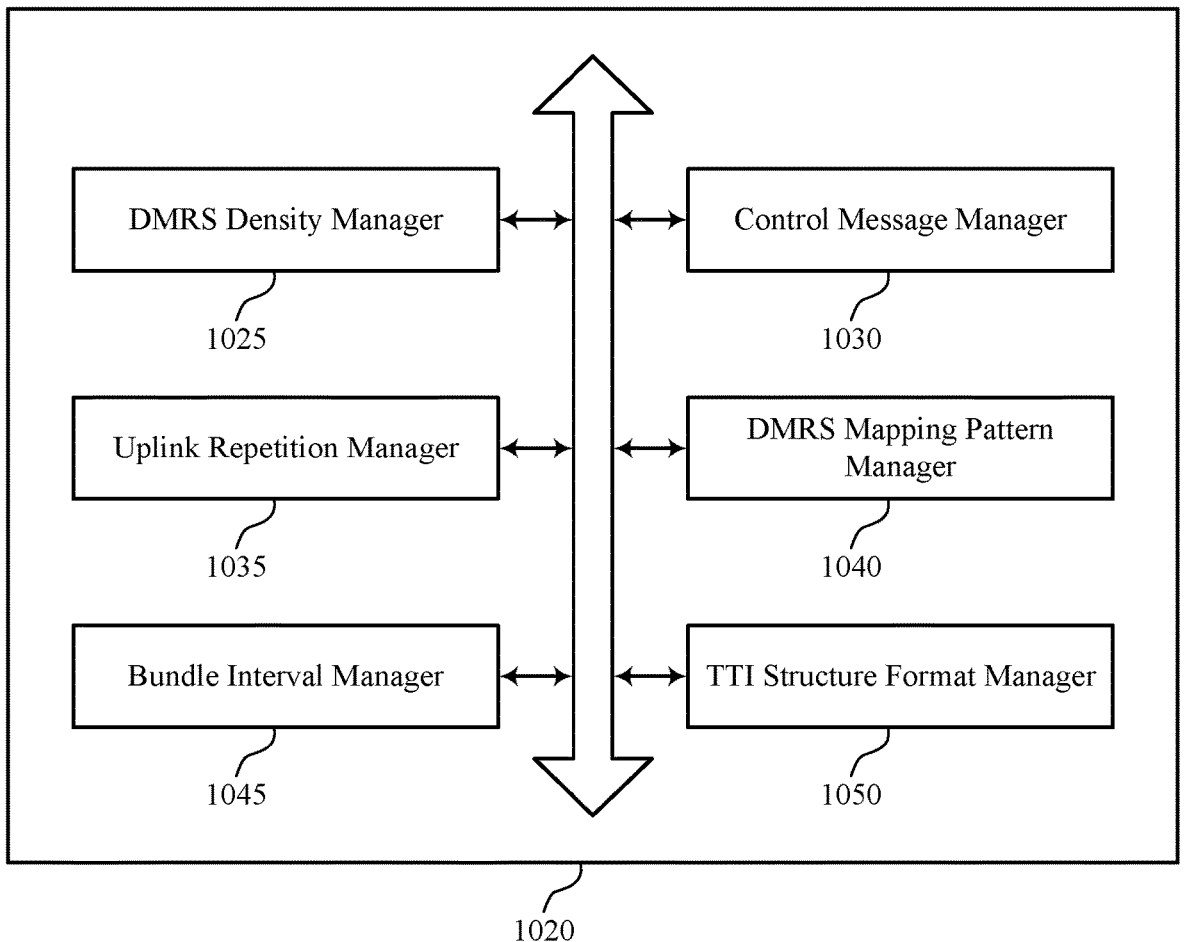
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of DMRS enhancement and bundling on physical channels as described herein. For example, the communications manager 1020 may include a DMRS density manager 1025, a control message manager 1030, an uplink repetition manager 1035, a DMRS mapping pattern manager 1040, a bundle interval manager 1045, a TTI structure format manager 1050, or any combination thereof. Each of these components may communicate, directly or indirectly, with one another (e.g., via one or more buses).

The communications manager 1020 may support wireless communications at a UE in accordance with examples as disclosed herein. The DMRS density manager 1025 may be configured as or otherwise support a means for identifying a first demodulation reference signal density configuration and a second demodulation reference signal density configuration that differs from the first demodulation reference signal density configuration. The control message manager 1030 may be configured as or otherwise support a means for receiving, from a base station, a control message configuring the UE to transmit a set of multiple repetitions of an uplink channel over a set of multiple bundle intervals. The uplink repetition manager 1035 may be configured as or otherwise support a means for transmitting, to the base station during a first transmission time interval of a first bundle interval of the set of multiple bundle intervals, a first repetition of the uplink channel in accordance with a first demodulation reference signal density configuration. In some examples, the uplink repetition manager 1035 may be configured as or otherwise support a means for transmitting, to the base station during a second transmission time interval of the first bundle interval, a second repetition of the uplink channel in accordance with a second demodulation reference signal density configuration that differs from the first demodulation reference signal density configuration.

In some examples, to support identifying, the DMRS density manager 1025 may be configured as or otherwise support a means for receiving, from the base station, control signaling indicating the first demodulation reference signal density configuration has a first demodulation reference signal density for uplink channel repetition, the second demodulation reference signal density configuration has a second demodulation reference signal density for uplink channel repetition, or both.

In some examples, the DMRS mapping pattern manager 1040 may be configured as or otherwise support a means for receiving, from the base station, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals.

In some examples, the DMRS mapping pattern manager 1040 may be configured as or otherwise support a means for transmitting, in accordance with the sequence, a first subset of the set of multiple repetitions of the uplink channel in accordance with the first demodulation reference signal density configuration and a second subset of the set of multiple repetitions of the uplink channel in accordance with the second demodulation reference signal density configuration.

In some examples, the DMRS mapping pattern manager 1040 may be configured as or otherwise support a means for receiving, from the base station, the control signaling indicating the demodulation reference signal mapping pattern that indicates the sequence that alternates between the first demodulation reference signal density configuration and the second demodulation reference signal density configuration over the set of multiple transmission time intervals.

In some examples, the DMRS mapping pattern manager 1040 may be configured as or otherwise support a means for receiving, from the base station, the control signaling indicating the demodulation reference signal mapping pattern that indicates the sequence that alternates between a single instance of the first demodulation reference signal density configuration and a set of multiple instances of the second demodulation reference signal density configuration over the set of multiple transmission time intervals.

In some examples, the DMRS mapping pattern manager 1040 may be configured as or otherwise support a means for receiving, from the base station, the control signaling indicating to restart the sequence at each boundary between consecutive pairs of bundle intervals of the set of multiple bundle intervals.

In some examples, the DMRS mapping pattern manager 1040 may be configured as or otherwise support a means for receiving, from the base station, the control signaling indicating to restart the sequence each time a phase continuity rule is not satisfied between a consecutive pair of uplink symbol periods within a same bundling interval of the set of multiple bundle intervals. .

In some examples, the DMRS mapping pattern manager 1040 may be configured as or otherwise support a means for receiving, from the base station, the control signaling indicating the demodulation reference signal mapping pattern that indicates the sequence corresponds to the set of multiple transmission time intervals that satisfy a phase continuity rule.

In some examples, transmitting the first repetition of the uplink channel includes transmitting a first repetition of an uplink message on the uplink channel. In some examples, transmitting the second repetition of the uplink channel includes transmitting a second repetition of the uplink message on the uplink channel.

In some examples, to support receiving the control message, the bundle interval manager 1045 may be configured as or otherwise support a means for receiving the control message that includes an indication of a bundle size indicating a number of consecutive transmission time intervals in each bundle interval of the set of multiple bundle intervals.

In some examples, to support receiving the control message, the TTI structure format manager 1050 may be configured as or otherwise support a means for receiving the control message that includes an indication of a transmission time interval structure format indicating a pattern of one or more uplink transmission time intervals and one or more downlink transmission time intervals over a set of multiple transmission time intervals.

In some examples, the uplink channel includes a physical uplink control channel.

In some examples, the uplink channel includes a physical uplink shared channel.

In some examples, the second demodulation reference signal density configuration indicates that a repetition of the uplink channel is to be transmitted without any demodulation reference signals.

In some examples, the second demodulation reference signal density configuration indicates that a repetition of the uplink channel is to be transmitted with a reduced number of demodulation reference signals as compared to the first demodulation reference signal density configuration.

Figure 11:
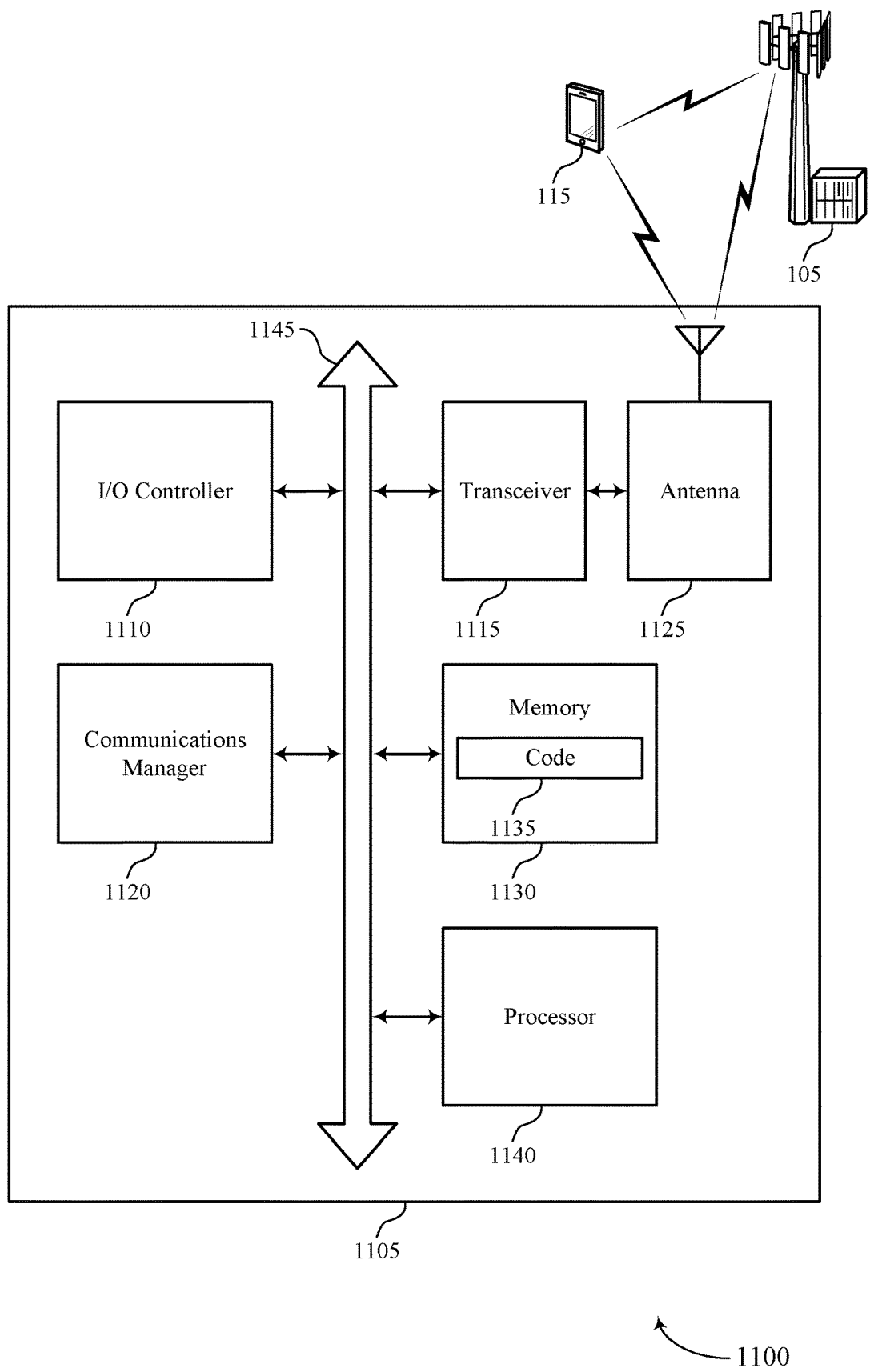
FIG. 11 shows a diagram of a system including a device in accordance with aspects of the present disclosure.

FIG. 11 shows a diagram of a system 1100 including a device 1105 that supports DMRS enhancement and bundling on physical channels in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DMRS enhancement and bundling on physical channels). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for identifying a first demodulation reference signal density configuration and a second demodulation reference signal density configuration that differs from the first demodulation reference signal density configuration. The communications manager 1120 may be configured as or otherwise support a means for receiving, from a base station, a control message configuring the UE to transmit a set of multiple repetitions of an uplink channel over a set of multiple bundle intervals. The communications manager 1120 may be configured as or otherwise support a means for transmitting, to the base station during a first transmission time interval of a first bundle interval of the set of multiple bundle intervals, a first repetition of the uplink channel in accordance with a first demodulation reference signal density configuration. The communications manager 1120 may be configured as or otherwise support a means for transmitting, to the base station during a second transmission time interval of the first bundle interval, a second repetition of the uplink channel in accordance with a second demodulation reference signal density configuration that differs from the first demodulation reference signal density configuration.

By including or configuring the communications manager 1120 in accordance with examples as described herein, the device 1105 may support techniques for DMRS enhancement and bundling, which may result in more efficient use of available system resources, improved reliability of uplink transmissions, decreased system latency, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of DMRS enhancement and bundling on physical channels as described herein, or the processor 1140 and the memory 1130 may be otherwise configured to perform or support such operations.

Figure 12:
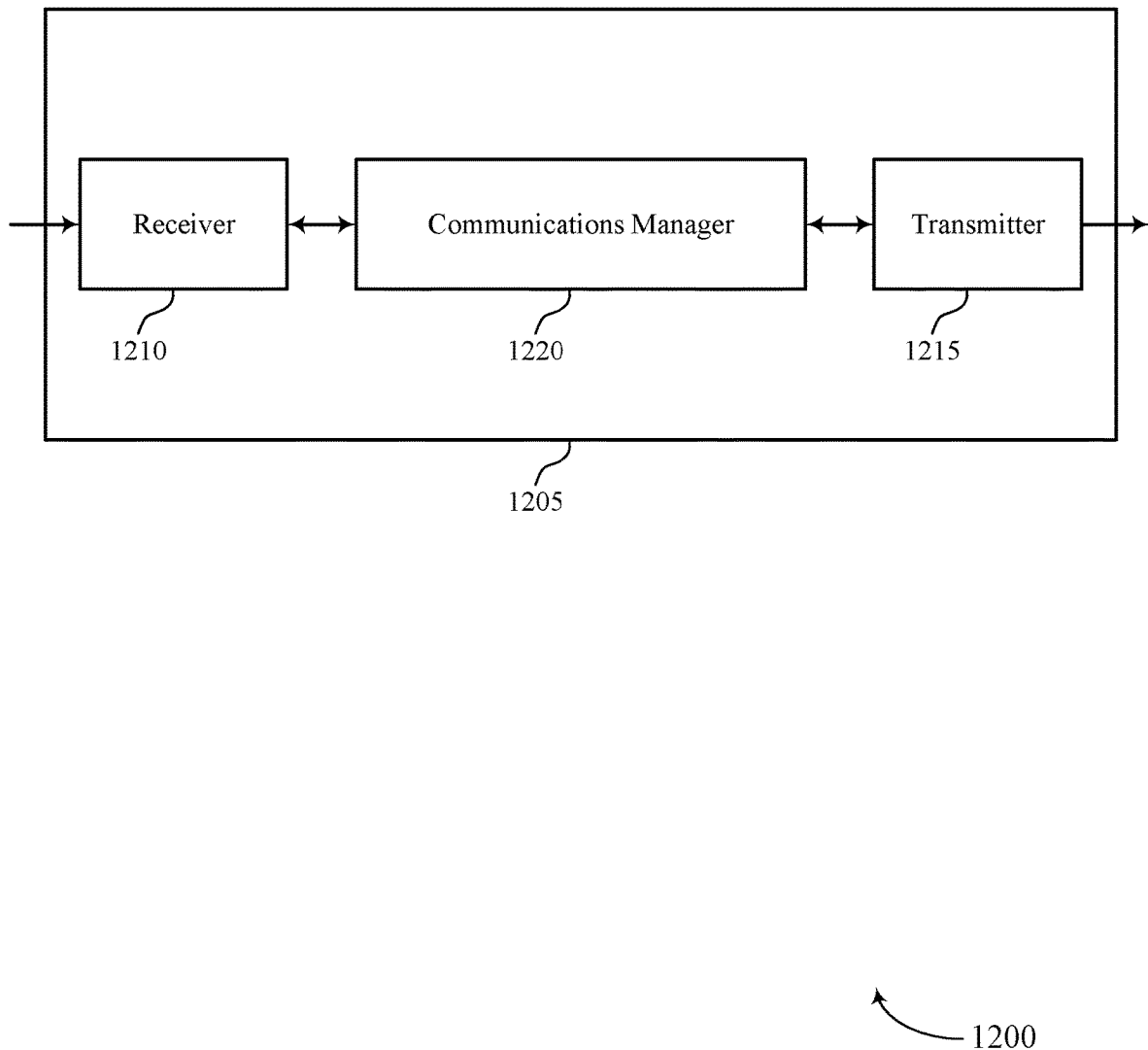
FIGS. 12 and 13 show block diagrams of devices in accordance with aspects of the present disclosure.

FIG. 12 shows a block diagram 1200 of a device 1205 that supports DMRS enhancement and bundling on physical channels in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to DMRS enhancement and bundling on physical channels). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to DMRS enhancement and bundling on physical channels). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of DMRS enhancement and bundling on physical channels as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for identifying a first demodulation reference signal density configuration and a second demodulation reference signal density configuration that differs from the first demodulation reference signal density configuration. The communications manager 1220 may be configured as or otherwise support a means for transmitting, to a UE, a control message configuring the UE to transmit a set of multiple repetitions of an uplink channel over a set of multiple bundle intervals. The communications manager 1220 may be configured as or otherwise support a means for receiving, from the UE during a first transmission time interval of a first bundle interval of the set of multiple bundle intervals, a first repetition of the uplink channel in accordance with a first demodulation reference signal density configuration. The communications manager 1220 may be configured as or otherwise support a means for receiving, from the UE during a second transmission time interval of the first bundle interval, a second repetition of the uplink channel in accordance with a second demodulation reference signal density configuration that differs from the first demodulation reference signal density configuration.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for DMRS enhancement and bundling, which may result in more efficient use of available system resources, improved reliability of uplink transmissions, decreased system latency, and improved user experience.

Figure 13:
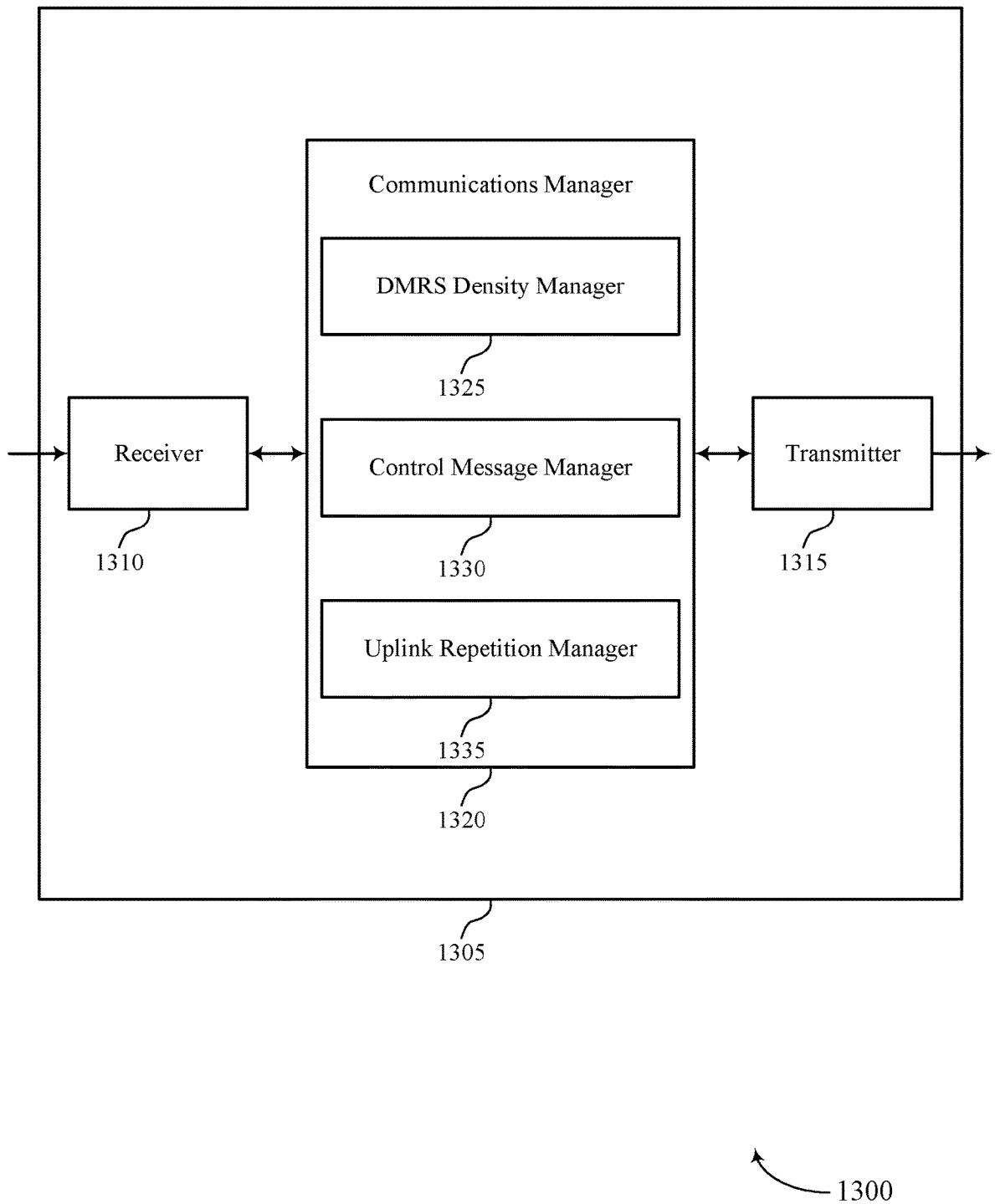

FIG. 13 shows a block diagram 1300 of a device 1305 in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to DMRS enhancement and bundling on physical channels). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to DMRS enhancement and bundling on physical channels). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of DMRS enhancement and bundling on physical channels as described herein. For example, the communications manager 1320 may include a DMRS density manager 1325, a control message manager 1330, an uplink repetition manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The DMRS density manager 1325 may be configured as or otherwise support a means for identifying a first demodulation reference signal density configuration and a second demodulation reference signal density configuration that differs from the first demodulation reference signal density configuration. The control message manager 1330 may be configured as or otherwise support a means for transmitting, to a UE, a control message configuring the UE to transmit a set of multiple repetitions of an uplink channel over a set of multiple bundle intervals. The uplink repetition manager 1335 may be configured as or otherwise support a means for receiving, from the UE during a first transmission time interval of a first bundle interval of the set of multiple bundle intervals, a first repetition of the uplink channel in accordance with a first demodulation reference signal density configuration. The uplink repetition manager 1335 may be configured as or otherwise support a means for receiving, from the UE during a second transmission time interval of the first bundle interval, a second repetition of the uplink channel in accordance with a second demodulation reference signal density configuration that differs from the first demodulation reference signal density configuration.

Figure 14:
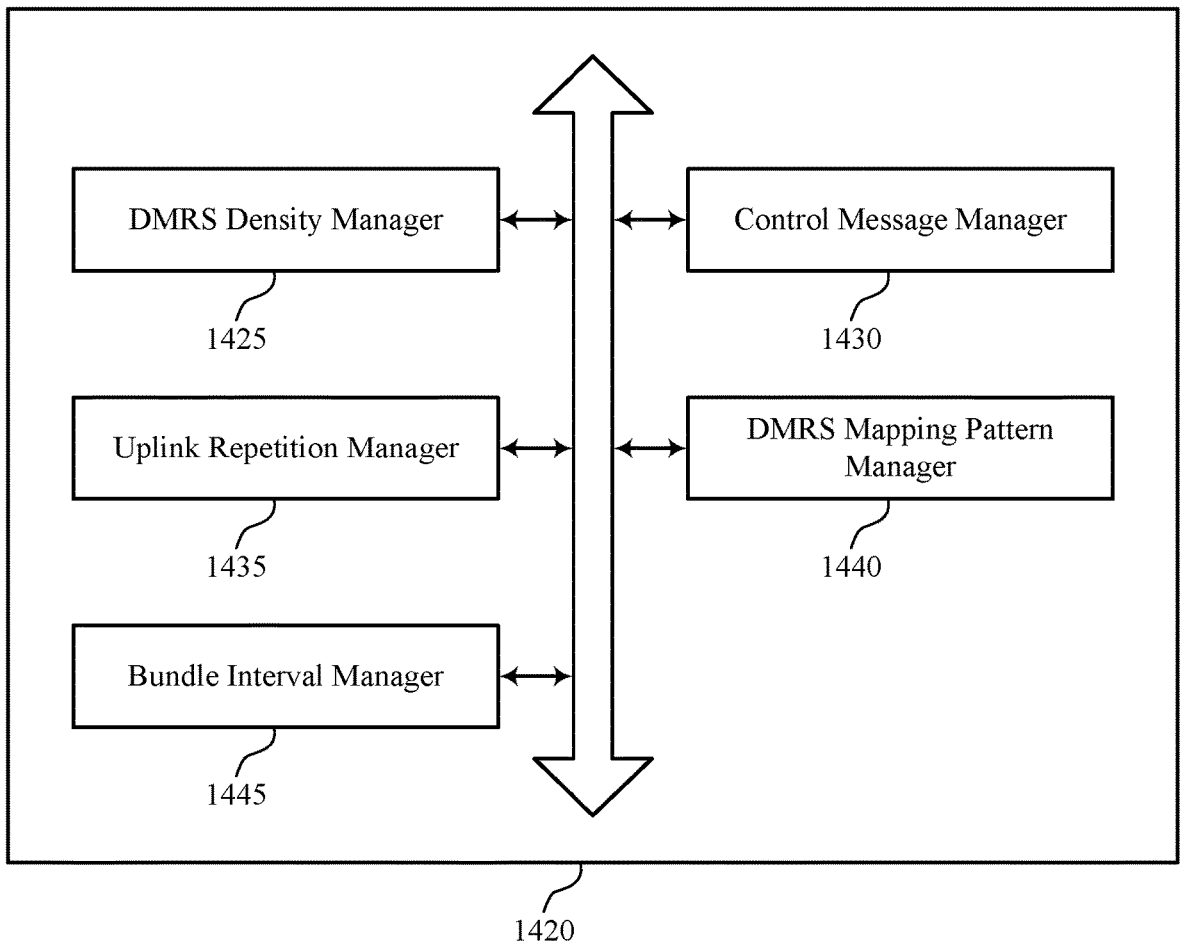
FIG. 14 shows a block diagram of a communications manager in accordance with aspects of the present disclosure.

FIG. 14 shows a block diagram 1400 of a communications manager 1420 that supports DMRS enhancement and bundling on physical channels in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of DMRS enhancement and bundling on physical channels as described herein. For example, the communications manager 1420 may include a DMRS density manager 1425, a control message manager 1430, an uplink repetition manager 1435, a DMRS mapping pattern manager 1440, a bundle interval manager 1445, or any combination thereof. Each of these components may communicate, directly or indirectly, with one another (e.g., via one or more buses).

The communications manager 1420 may support wireless communications at a base station in accordance with examples as disclosed herein. The DMRS density manager 1425 may be configured as or otherwise support a means for identifying a first demodulation reference signal density configuration and a second demodulation reference signal density configuration that differs from the first demodulation reference signal density configuration. The control message manager 1430 may be configured as or otherwise support a means for transmitting, to a UE, a control message configuring the UE to transmit a set of multiple repetitions of an uplink channel over a set of multiple bundle intervals. The uplink repetition manager 1435 may be configured as or otherwise support a means for receiving, from the UE during a first transmission time interval of a first bundle interval of the set of multiple bundle intervals, a first repetition of the uplink channel in accordance with a first demodulation reference signal density configuration. In some examples, the uplink repetition manager 1435 may be configured as or otherwise support a means for receiving, from the UE during a second transmission time interval of the first bundle interval, a second repetition of the uplink channel in accordance with a second demodulation reference signal density configuration that differs from the first demodulation reference signal density configuration.

In some examples, the DMRS density manager 1425 may be configured as or otherwise support a means for transmitting, to the UE, control signaling indicating the first demodulation reference signal density configuration has a first demodulation reference signal density for uplink channel repetition, the second demodulation reference signal density configuration has a second demodulation reference signal density for uplink channel repetition, or both.

In some examples, the DMRS mapping pattern manager 1440 may be configured as or otherwise support a means for transmitting, to the UE, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals.

In some examples, the DMRS mapping pattern manager 1440 may be configured as or otherwise support a means for receiving, in accordance with the sequence, a first subset of the set of multiple repetitions of the uplink channel in accordance with the first demodulation reference signal density configuration and a second subset of the set of multiple repetitions of the uplink channel having the second demodulation reference signal density configuration.

In some examples, the DMRS mapping pattern manager 1440 may be configured as or otherwise support a means for transmitting, to the UE, the control signaling indicating the demodulation reference signal mapping pattern that indicates the sequence that alternates between the first demodulation reference signal density configuration and the second demodulation reference signal density configuration over the set of multiple transmission time intervals.

In some examples, the DMRS mapping pattern manager 1440 may be configured as or otherwise support a means for transmitting to the UE, the control signaling indicating the demodulation reference signal mapping pattern that indicates the sequence that alternates between a single instance of the first demodulation reference signal density configuration and a set of multiple instances of the second demodulation reference signal density configuration over the set of multiple transmission time intervals.

In some examples, the DMRS mapping pattern manager 1440 may be configured as or otherwise support a means for transmitting to the UE, the control signaling indicating to restart the sequence at each boundary between consecutive pairs of bundle intervals of the set of multiple bundle intervals.

In some examples, the DMRS mapping pattern manager 1440 may be configured as or otherwise support a means for transmitting to the UE, the control signaling indicating to restart the sequence each time a phase continuity rule is not satisfied between a consecutive pair of uplink symbol periods within a same bundling interval of the set of multiple bundle intervals.

In some examples, the DMRS mapping pattern manager 1440 may be configured as or otherwise support a means for transmitting to the UE, the control signaling indicating the demodulation reference signal mapping pattern that indicates the sequence corresponds to the set of multiple transmission time intervals that satisfy a phase continuity rule.

In some examples, receiving the first repetition of the uplink channel includes receiving a first repetition of an uplink message on the uplink channel. In some examples, receiving the second repetition of the uplink channel includes receiving a second repetition of the uplink message on the uplink channel.

In some examples, to support transmitting the control message, the bundle interval manager 1445 may be configured as or otherwise support a means for transmitting, the control message that includes an indication of a bundle size indicating a number of consecutive transmission time intervals in each bundle interval of the set of multiple bundle intervals.

In some examples, the uplink channel includes a physical uplink control channel.

In some examples, the uplink channel includes a physical uplink shared channel.

In some examples, the second demodulation reference signal density configuration indicates that a repetition of the uplink channel is to be transmitted without any demodulation reference signals.

In some examples, the second demodulation reference signal density configuration indicates that a repetition of the uplink channel is to be transmitted with a reduced number of demodulation reference signals as compared to the first demodulation reference signal density configuration.

Figure 15:
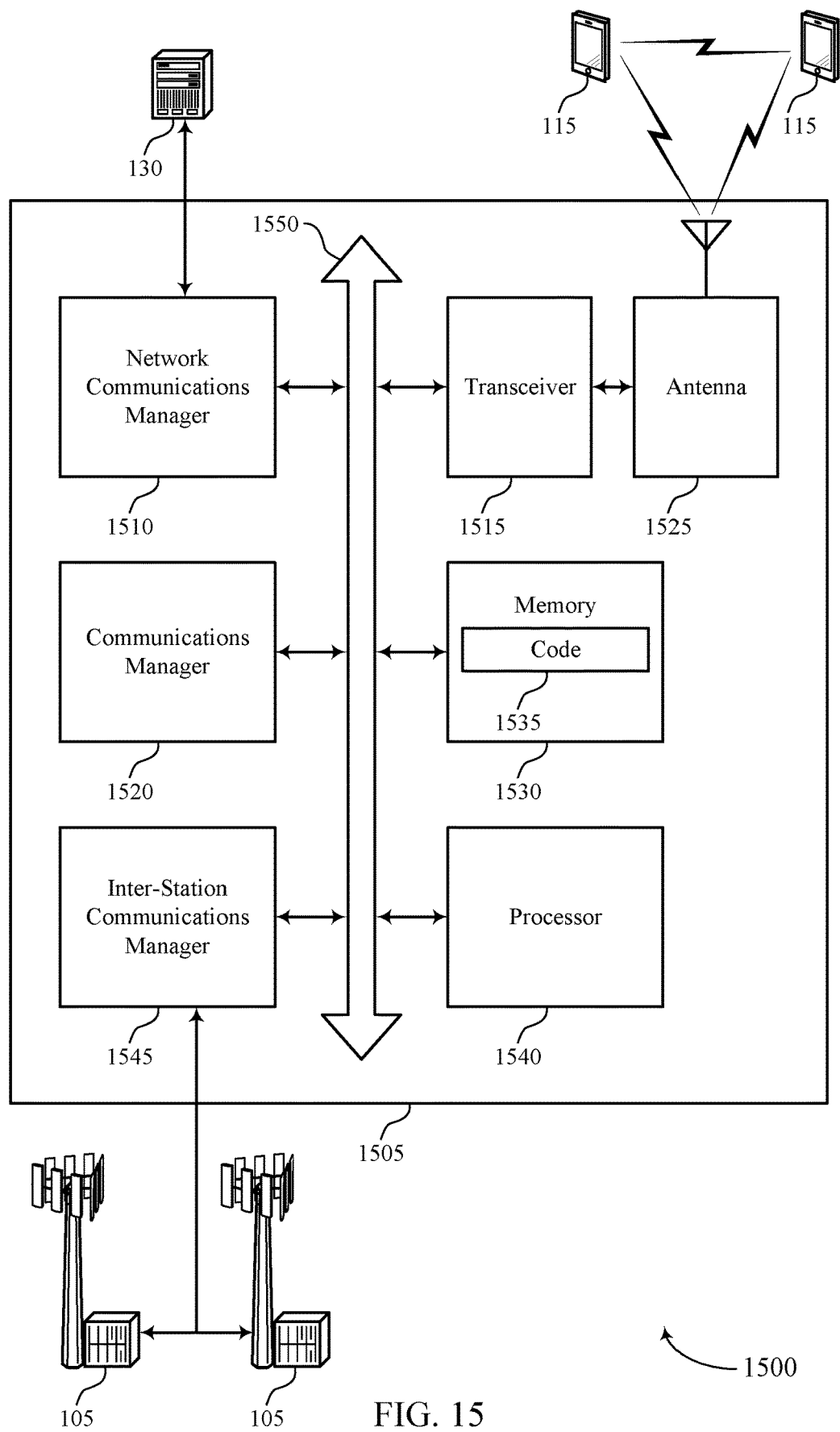
FIG. 15 shows a diagram of a system including a device in accordance with aspects of the present disclosure.

FIG. 15 shows a diagram of a system 1500 including a device 1505 that supports DMRS enhancement and bundling on physical channels in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter

1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting DMRS enhancement and bundling on physical channels). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for identifying a first demodulation reference signal density configuration and a second demodulation reference signal density configuration that differs from the first demodulation reference signal density configuration. The communications manager 1520 may be configured as or otherwise support a means for transmitting, to a UE, a control message configuring the UE to transmit a set of multiple repetitions of an uplink channel over a set of multiple bundle intervals. The communications manager 1520 may be configured as or otherwise support a means for receiving, from the UE during a first transmission time interval of a first bundle interval of the set of multiple bundle intervals, a first repetition of the uplink channel in accordance with a first demodulation reference signal density configuration. The communications manager 1520 may be configured as or otherwise support a means for receiving, from the UE during a second transmission time interval of the first bundle interval, a second repetition of the uplink channel in accordance with a second demodulation reference signal density configuration that differs from the first demodulation reference signal density configuration.

By including or configuring the communications manager 1520 in accordance with examples as described herein, the device 1505 may support techniques for DMRS enhancement and bundling, which may result in more efficient use of available system resources, improved reliability of uplink transmissions, decreased system latency, and improved user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of DMRS enhancement and bundling on physical channels as described herein, or the processor 1540 and the memory 1530 may be otherwise configured to perform or support such operations.

Figure 16:
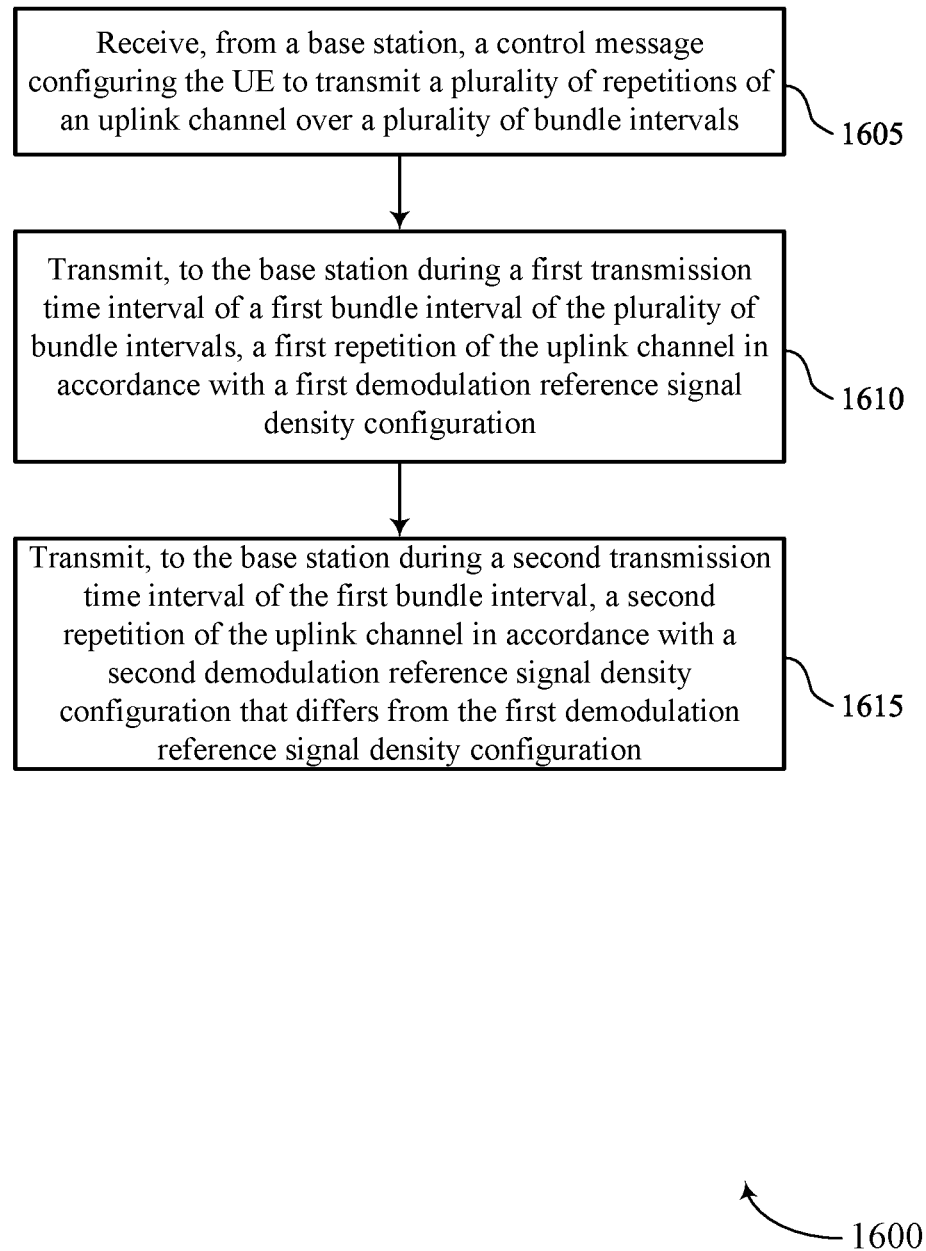
FIGS. 16 through 19 show flowcharts illustrating methods in accordance with aspects of the present disclosure.

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, a control message configuring the UE to transmit a set of multiple repetitions of an uplink channel over a set of multiple bundle intervals. The operations of 1605 may be performed in accordance with examples as disclosed herein. In some examples, aspects of the operations of 1605 may be performed by a control message manager 1030 as described with reference to FIG. 10.

At 1610, the method may include transmitting, to the base station during a first transmission time interval of a first bundle interval of the set of multiple bundle intervals, a first repetition of the uplink channel in accordance with a first demodulation reference signal density configuration. The operations of 1610 may be performed in accordance with examples as disclosed herein. In some examples, aspects of the operations of 1610 may be performed by an uplink repetition manager 1035 as described with reference to FIG. 10.

At 1615, the method may include transmitting, to the base station during a second transmission time interval of the first bundle interval, a second repetition of the uplink channel in accordance with a second demodulation reference signal density configuration that differs from the first demodulation reference signal density configuration. The operations of 1615 may be performed in accordance with examples as disclosed herein. In some examples, aspects of the operations of 1615 may be performed by an uplink repetition manager 1035 as described with reference to FIG. 10.

Figure 17:
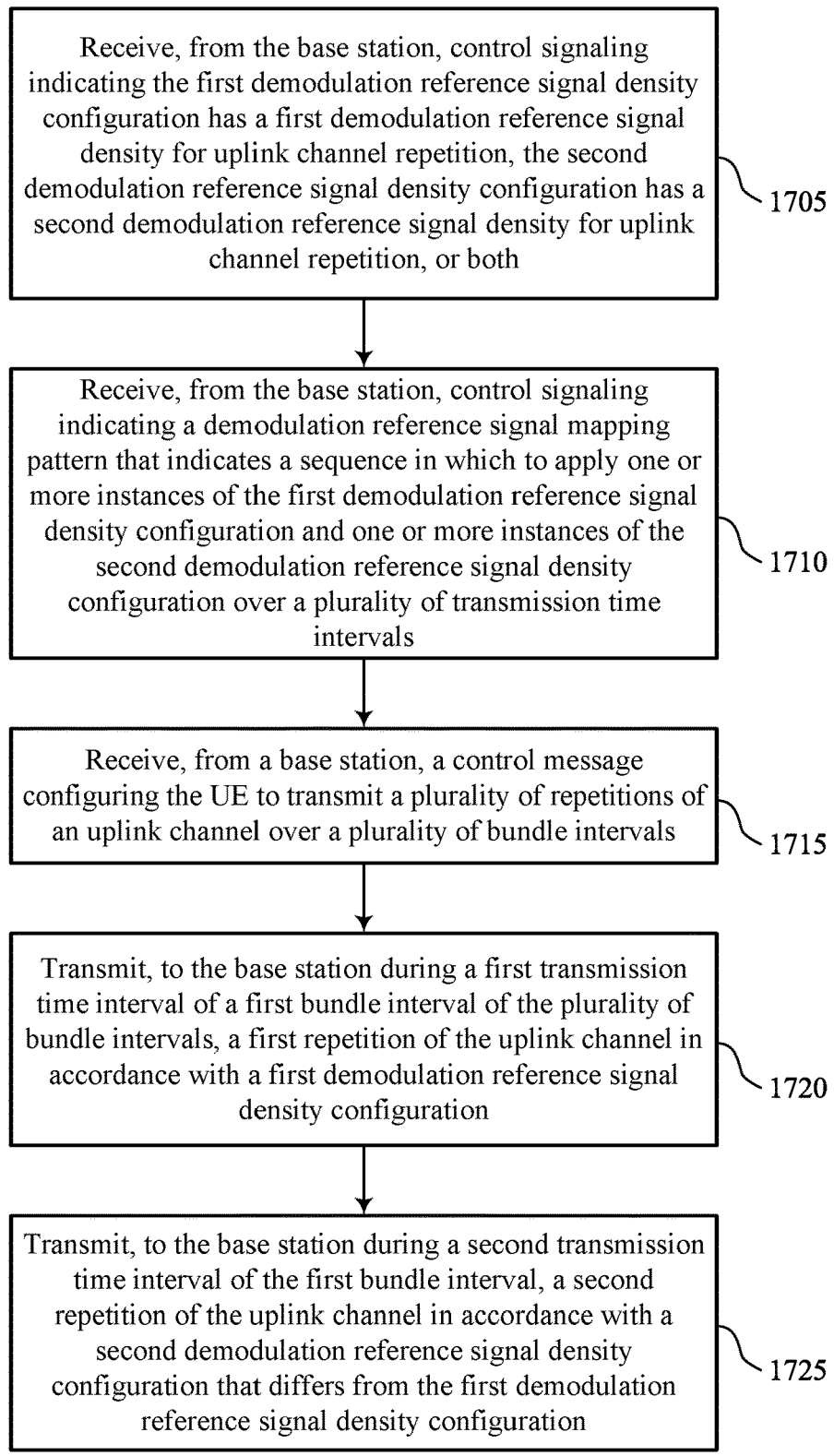

FIG. 17 shows a flowchart illustrating a method 1700 in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from the base station, control signaling indicating the first demodulation reference signal density configuration has a first demodulation reference signal density for uplink channel repetition, the second demodulation reference signal density configuration has a second demodulation reference signal density for uplink channel repetition, or both. The operations of 1705 may be performed in accordance with examples as disclosed herein. In some examples, aspects of the operations of 1705 may be performed by a DMRS density manager 1025 as described with reference to FIG. 10.

At 1710, the method may include receiving, from the base station, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals. The operations of 1710 may be performed in accordance with examples as disclosed herein. In some examples, aspects of the operations of 1710 may be performed by a DMRS mapping pattern manager 1040 as described with reference to FIG. 10.

At 1715, the method may include receiving, from a base station, a control message configuring the UE to transmit a set of multiple repetitions of an uplink channel over a set of multiple bundle intervals. The operations of 1715 may be performed in accordance with examples as disclosed herein. In some examples, aspects of the operations of 1715 may be performed by a control message manager 1030 as described with reference to FIG. 10.

At 1720, the method may include transmitting, to the base station during a first transmission time interval of a first bundle interval of the set of multiple bundle intervals, a first repetition of the uplink channel in accordance with a first demodulation reference signal density configuration. The operations of 1720 may be performed in accordance with examples as disclosed herein. In some examples, aspects of the operations of 1720 may be performed by an uplink repetition manager 1035 as described with reference to FIG. 10.

At 1725, the method may include transmitting, to the base station during a second transmission time interval of the first bundle interval, a second repetition of the uplink channel in accordance with a second demodulation reference signal density configuration that differs from the first demodulation reference signal density configuration. The operations of 1725 may be performed in accordance with examples as disclosed herein. In some examples, aspects of the operations of 1725 may be performed by an uplink repetition manager 1035 as described with reference to FIG. 10.

Figure 18:
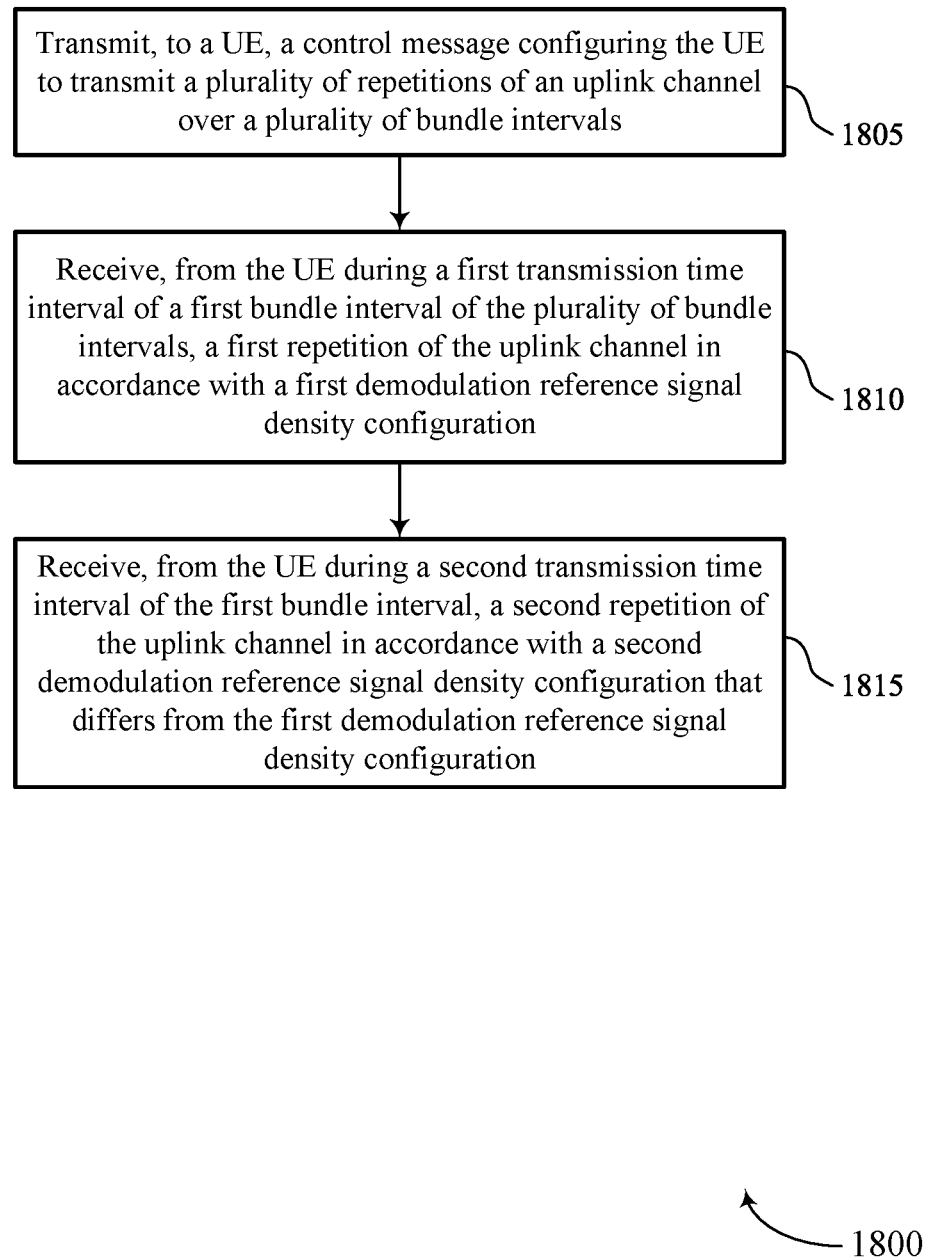

FIG. 18 shows a flowchart illustrating a method 1800 in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, a control message configuring the UE to transmit a set of multiple repetitions of an uplink channel over a set of multiple bundle intervals. The operations of 1805 may be performed in accordance with examples as disclosed herein. In some examples, aspects of the operations of 1805 may be performed by a control message manager 1430 as described with reference to FIG. 14.

At 1810, the method may include receiving, from the UE during a first transmission time interval of a first bundle interval of the set of multiple bundle intervals, a first repetition of the uplink channel in accordance with a first demodulation reference signal density configuration. The operations of 1810 may be performed in accordance with examples as disclosed herein. In some examples, aspects of the operations of 1810 may be performed by an uplink repetition manager 1435 as described with reference to FIG. 14.

At 1815, the method may include receiving, from the UE during a second transmission time interval of the first bundle interval, a second repetition of the uplink channel in accordance with a second demodulation reference signal density configuration that differs from the first demodulation reference signal density configuration. The operations of 1815 may be performed in accordance with examples as disclosed herein. In some examples, aspects of the operations of 1815 may be performed by an uplink repetition manager 1435 as described with reference to FIG. 14.

Figure 19:
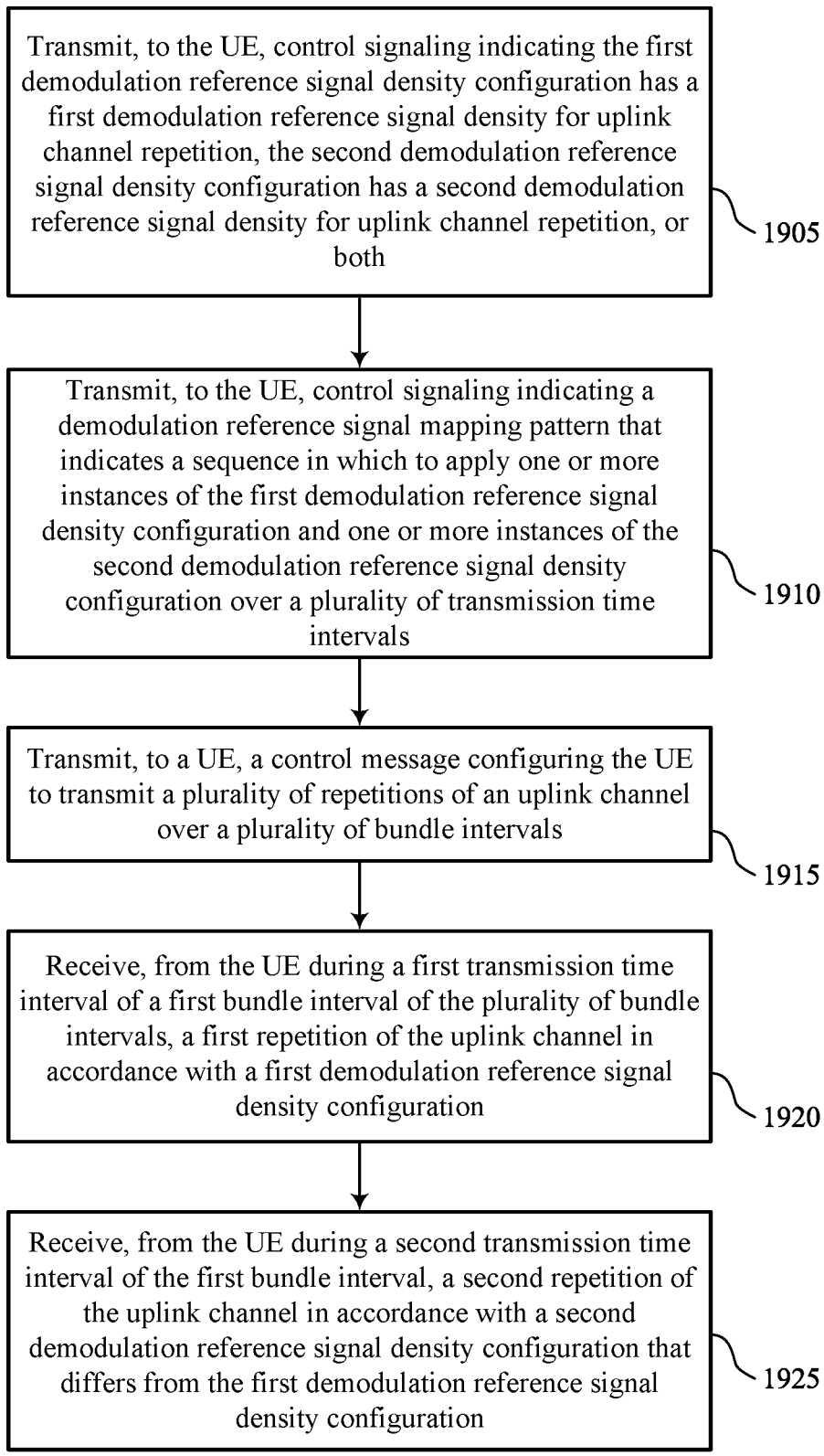

FIG. 19 shows a flowchart illustrating a method in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting, to the UE, control signaling indicating the first demodulation reference signal density configuration has a first demodulation reference signal density for uplink channel repetition, the second demodulation reference signal density configuration has a second demodulation reference signal density for uplink channel repetition, or both. The operations of 1905 may be performed in accordance with examples as disclosed herein. In some examples, aspects of the operations of 1905 may be performed by a DMRS density manager 1425 as described with reference to FIG. 14.

At 1910, the method may include transmitting, to the UE, control signaling indicating a demodulation reference signal mapping pattern that indicates a sequence in which to apply one or more instances of the first demodulation reference signal density configuration and one or more instances of the second demodulation reference signal density configuration over a set of multiple transmission time intervals. The operations of 1910 may be performed in accordance with examples as disclosed herein. In some examples, aspects of the operations of 1910 may be performed by a DMRS mapping pattern manager 1440 as described with reference to FIG. 14.

At 1915, the method may include transmitting, to a UE, a control message configuring the UE to transmit a set of multiple repetitions of an uplink channel over a set of multiple bundle intervals. The operations of 1915 may be performed in accordance with examples as disclosed herein. In some examples, aspects of the operations of 1915 may be performed by a control message manager 1430 as described with reference to FIG. 14.

At 1920, the method may include receiving, from the UE during a first transmission time interval of a first bundle interval of the set of multiple bundle intervals, a first repetition of the uplink channel in accordance with a first demodulation reference signal density configuration. The operations of 1920 may be performed in accordance with examples as disclosed herein. In some examples, aspects of the operations of 1920 may be performed by an uplink repetition manager 1435 as described with reference to FIG. 14.

At 1925, the method may include receiving, from the UE during a second transmission time interval of the first bundle interval, a second repetition of the uplink channel in accordance with a second demodulation reference signal density configuration that differs from the first demodulation reference signal density configuration. The operations of 1925 may be performed in accordance with examples as disclosed herein. In some examples, aspects of the operations of 1925 may be performed by an uplink repetition manager 1435 as described with reference to FIG. 14.

Aspect 1: A method for wireless communications at a UE, comprising: receiving, from a base station, a control message configuring the UE to transmit a plurality of repetitions of an uplink channel over a plurality of bundle intervals; transmitting, to the base station during a first transmission time interval of a first bundle interval of the plurality of bundle intervals, a first repetition of the uplink channel in accordance with a first demodulation reference signal density configuration; and transmitting, to the base station during a second transmission time interval of the first bundle interval, a second repetition of the uplink channel in accordance with a second demodulation reference signal density configuration that differs from the first demodulation reference signal density configuration.

Aspect 2: The method of aspect 1, wherein the identifying further comprises: receiving, from the base station, control signaling indicating the first demodulation reference signal density configuration has a first demodulation reference signal density for uplink channel repetition, the second demodulation reference signal density configuration has a second demodulation reference signal density for uplink channel repetition, or both.

Aspect 3: The method of any of aspects 1 through 2, further comprising: receiving, from the base station, control signaling indicating a demodulation reference signal mapping pattern that indicates a sequence in which to apply one or more instances of the first demodulation reference signal density configuration and one or more instances of the second demodulation reference signal density configuration over a plurality of transmission time intervals.

Aspect 4: The method of aspect 3, further comprising: transmitting, in accordance with the sequence, a first subset of the plurality of repetitions of the uplink channel in accordance with the first demodulation reference signal density configuration and a second subset of the plurality of repetitions of the uplink channel in accordance with the second demodulation reference signal density configuration.

Aspect 5: The method of any of aspects 3 through 4, further comprising: receiving, from the base station, the control signaling indicating the demodulation reference signal mapping pattern that indicates the sequence that alternates between the first demodulation reference signal density configuration and the second demodulation reference signal density configuration over the plurality of transmission time intervals.

Aspect 6: The method of any of aspects 3 through 5, further comprising: receiving, from the base station, the control signaling indicating the demodulation reference signal mapping pattern that indicates the sequence that alternates between a single instance of the first demodulation reference signal density configuration and a plurality of instances of the second demodulation reference signal density configuration over the plurality of transmission time intervals.

Aspect 7: The method of any of aspects 3 through 6, further comprising:
receiving, from the base station, the control signaling indicating to restart the sequence at each boundary between consecutive pairs of bundle intervals of the plurality of bundle intervals.

Aspect 8: The method of any of aspects 3 through 7, further comprising: receiving, from the base station, the control signaling indicating to restart the sequence each time a phase continuity rule is not satisfied between a consecutive pair of uplink symbol periods within a same bundling interval of the plurality of bundle intervals. .

Aspect 9: The method of any of aspects 3 through 8, further comprising: receiving, from the base station, the control signaling indicating the demodulation reference signal mapping pattern that indicates the sequence corresponds to the plurality of transmission time intervals that satisfy a phase continuity rule.

Aspect 10: The method of any of aspects 1 through 9, wherein transmitting the first repetition of the uplink channel comprises transmitting a first repetition of an uplink message on the uplink channel; and transmitting the second repetition of the uplink channel comprises transmitting a second repetition of the uplink message on the uplink channel.

Aspect 11: The method of any of aspects 1 through 10, wherein receiving the control message comprises: receiving the control message that comprises an indication of a bundle size indicating a number of consecutive transmission time intervals in each bundle interval of the plurality of bundle intervals.

Aspect 12: The method of any of aspects 1 through 11, wherein receiving the control message comprises: receiving the control message that comprises an indication of a transmission time interval structure format indicating a pattern of one or more uplink transmission time intervals and one or more downlink transmission time intervals over a plurality of transmission time intervals.

Aspect 13: The method of any of aspects 1 through 12, wherein the uplink channel comprises a physical uplink control channel.

Aspect 14: The method of any of aspects 1 through 13, wherein the uplink channel comprises a physical uplink shared channel .

Aspect 15: The method of any of aspects 1 through 14, wherein the second demodulation reference signal density configuration indicates that a repetition of the uplink channel is to be transmitted without any demodulation reference signals.

Aspect 16: The method of any of aspects 1 through 15, wherein the second demodulation reference signal density configuration indicates that a repetition of the uplink channel is to be transmitted with a reduced number of demodulation reference signals as compared to the first demodulation reference signal density configuration.

Aspect 17: A method for wireless communications at a base station, comprising: transmitting, to a UE, a control message configuring the UE to transmit a plurality of repetitions of an uplink channel over a plurality of bundle intervals receiving, from the UE during a first transmission time interval of a first bundle interval of the plurality of bundle intervals, a first repetition of the uplink channel in accordance with a first demodulation reference signal density configuration; and receiving, from the UE during a second transmission time interval of the first bundle interval, a second repetition of the uplink channel in accordance with a second demodulation reference signal density configuration that differs from the first demodulation reference signal density configuration.

Aspect 18: The method of aspect 17, further comprising: transmitting, to the UE, control signaling indicating the first demodulation reference signal density configuration has a first demodulation reference signal density for uplink channel repetition, the second demodulation reference signal density configuration has a second demodulation reference signal density for uplink channel repetition, or both.

Aspect 19: The method of any of aspects 17 through 18, further comprising: transmitting, to the UE, control signaling indicating a demodulation reference signal mapping pattern that indicates a sequence in which to apply one or more instances of the first demodulation reference signal density configuration and one or more instances of the second demodulation reference signal density configuration over a plurality of transmission time intervals.

Aspect 20: The method of aspect 19, further comprising: receiving, in accordance with the sequence, a first subset of the plurality of repetitions of the uplink channel in accordance with the first demodulation reference signal density configuration and a second subset of the plurality of repetitions of the uplink channel having the second demodulation reference signal density configuration.

Aspect 21: The method of any of aspects 19 through 20, further comprising: transmitting, to the UE, the control signaling indicating the demodulation reference signal mapping pattern that indicates the sequence that alternates between the first demodulation reference signal density configuration and the second demodulation reference signal density configuration over the plurality of transmission time intervals.

Aspect 22: The method of any of aspects 19 through 21, further comprising: transmitting to the UE, the control signaling indicating the demodulation reference signal mapping pattern that indicates the sequence that alternates between a single instance of the first demodulation reference signal density configuration and a plurality of instances of the second demodulation reference signal density configuration over the plurality of transmission time intervals.

Aspect 23: The method of any of aspects 19 through 22, further comprising: transmitting to the UE, the control signaling indicating to restart the sequence at each boundary between consecutive pairs of bundle intervals of the plurality of bundle intervals.

Aspect 24: The method of any of aspects 19 through 23, further comprising: transmitting to the UE, the control signaling indicating to restart the sequence each time a phase continuity rule is not satisfied between a consecutive pair of uplink symbol periods within a same bundling interval of the plurality of bundle intervals.

Aspect 25: The method of any of aspects 19 through 24, further comprising: transmitting to the UE, the control signaling indicating the demodulation reference signal mapping pattern that indicates the sequence corresponds to the plurality of transmission time intervals that satisfy a phase continuity rule.

Aspect 26: The method of any of aspects 17 through 25, wherein receiving the first repetition of the uplink channel comprises receiving a first repetition of an uplink message on the uplink channel; and receiving the second repetition of the uplink channel comprises receiving a second repetition of the uplink message on the uplink channel.

Aspect 27: The method of any of aspects 17 through 26, wherein transmitting the control message comprises: transmitting, the control message that comprises an indication of a bundle size indicating a number of consecutive transmission time intervals in each bundle interval of the plurality of bundle intervals.

Aspect 28: The method of any of aspects 17 through 27, wherein the uplink channel comprises a physical uplink control channel.

Aspect 29: The method of any of aspects 17 through 28, wherein the uplink channel comprises a physical uplink shared channel.

Aspect 30: The method of any of aspects 17 through 29, wherein the second demodulation reference signal density configuration indicates that a repetition of the uplink channel is to be transmitted without any demodulation reference signals.

Aspect 31: The method of any of aspects 17 through 30, wherein the second demodulation reference signal density configuration indicates that a repetition of the uplink channel is to be transmitted with a reduced number of demodulation reference signals as compared to the first demodulation reference signal density configuration.

Aspect 32: An apparatus for wireless communications at a UE, comprising a processor; memory coupled with the processor; and instructions stored in the memory and executable by the processor to cause the apparatus to perform a method of any of aspects 1 through 16.

Aspect 33: An apparatus for wireless communications at a UE, comprising at least one means for performing a method of any of aspects 1 through 16.

Aspect 34: A non-transitory computer-readable medium storing code for wireless communications at a UE, the code comprising instructions executable by a processor to perform a method of any of aspects 1 through 16.

Aspect 35: An apparatus for wireless communications at a base station, comprising a processor; memory coupled with the processor; and instructions stored in the memory and executable by the processor to cause the apparatus to perform a method of any of aspects 17 through 31.

Aspect 36: An apparatus for wireless communications at a base station, comprising at least one means for performing a method of any of aspects 17 through 31.

Aspect 37: A non-transitory computer-readable medium storing code for wireless communications at a base station, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a transceiver;
   one or more processors;
   one or more memories coupled with the one or more processors; and instructions stored in the one or more memories and executable by the one or more processors to cause the apparatus to:

receive, from a base station via the transceiver, a control message configuring the UE to transmit a plurality of repetitions of an uplink channel over a plurality of bundle intervals;

transmit, to the base station during a first transmission time interval of a first bundle interval of the plurality of bundle intervals, a first repetition of the uplink channel in accordance with a first demodulation reference signal density configuration; and transmit, to the base station during a second transmission time interval of the first bundle interval, a second repetition of the uplink channel in accordance with a second demodulation reference signal density configuration, wherein the second demodulation reference signal density configuration indicates that a repetition of the uplink channel is to be transmitted without any demodulation reference signals or with a reduced quantity of demodulation reference signals as compared to the first demodulation reference signal density configuration.

2. The apparatus of claim 1, wherein the instructions are further executable by the one or more processors to cause the apparatus to:

receive, from the base station, control signaling indicating the first demodulation reference signal density configuration has a first demodulation reference signal density for uplink channel repetition, the second demodulation reference signal density configuration has a second demodulation reference signal density for uplink channel repetition, or both.

3. The apparatus of claim 1, wherein the instructions are further executable by the one or more processors to cause the apparatus to:

receive, from the base station, control signaling indicating a demodulation reference signal mapping pattern that indicates a sequence in which to apply one or more instances of the first demodulation reference signal density configuration and one or more instances of the second demodulation reference signal density configuration over a plurality of transmission time intervals.

4. The apparatus of claim 3, wherein the instructions are further executable by the one or more processors to cause the apparatus to:

transmit, in accordance with the sequence, a first subset of the plurality of repetitions of the uplink channel in accordance with the first demodulation reference signal density configuration and a second subset of the plurality of repetitions of the uplink channel in accordance with the second demodulation reference signal density configuration.

5. The apparatus of claim 3, wherein the sequence alternates between the first demodulation reference signal density configuration and the second demodulation reference signal density configuration over the plurality of transmission time intervals.

6. The apparatus of claim 3, wherein the sequence alternates between a single instance of the first demodulation reference signal density configuration and a plurality of instances of the second demodulation reference signal density configuration over the plurality of transmission time intervals.

7. The apparatus of claim 3, wherein the control signaling indicates to restart the sequence each time a phase continuity rule is not satisfied between a consecutive pair of uplink symbol periods within a same bundling interval of the plurality of bundle intervals.

8. The apparatus of claim 3, wherein the sequence corresponds to the plurality of transmission time intervals that satisfy a phase continuity rule.

9. The apparatus of claim 1, wherein the instructions to transmit the first repetition and the second repetition are executable by the one or more processors to cause the apparatus to:

transmit a first repetition of an uplink message on the uplink channel; and transmit a second repetition of the uplink message on the uplink channel.

10. The apparatus of claim 1, wherein the instructions to receive the control message are executable by the one or more processors to cause the apparatus to:

receive the control message that comprises an indication of a bundle size indicating a quantity of consecutive transmission time intervals in each bundle interval of the plurality of bundle intervals.

11. The apparatus of claim 1, wherein the instructions to receive the control message are executable by the one or more processors to cause the apparatus to:

receive the control message that comprises an indication of a transmission time interval structure format indicating a pattern of one or more uplink transmission time intervals and one or more downlink transmission time intervals over a plurality of transmission time intervals.

12. The apparatus of claim 1, wherein the uplink channel comprises a physical uplink control channel.

13. The apparatus of claim 1, wherein the uplink channel comprises a physical uplink shared channel.

14. An apparatus for wireless communications at a base station, comprising:

a transceiver;

one or more processors;

one or more memories coupled with the one or more processors; and instructions stored in the one or more memories and executable by the one or more processors to cause the apparatus to:

transmit, to a user equipment (UE) via the transceiver, a control message configuring the UE to transmit a plurality of repetitions of an uplink channel over a plurality of bundle intervals;

receive, from the UE during a first transmission time interval of a first bundle interval of the plurality of bundle intervals, a first repetition of the uplink channel in accordance with a first demodulation reference signal density configuration; and receive, from the UE during a second transmission time interval of the first bundle interval, a second repetition of the uplink channel in accordance with a second demodulation reference signal density configuration, wherein the second demodulation reference signal density configuration indicates that a repetition of the uplink channel is to be transmitted without any demodulation reference signals or with a reduced quantity of demodulation reference signals as compared to the first demodulation reference signal density configuration.

15. The apparatus of claim 14, wherein the instructions are further executable by the one or more processors to cause the apparatus to:

transmit, to the UE, control signaling indicating the first demodulation reference signal density configuration has a first demodulation reference signal density for uplink channel repetition, the second demodulation reference signal density configuration has a second demodulation reference signal density for uplink channel repetition, or both.

16. The apparatus of claim 14, wherein the instructions are further executable by the one or more processors to cause the apparatus to:
transmit, to the UE, control signaling indicating a demodulation reference signal mapping pattern that indicates a sequence in which to apply one or more instances of the first demodulation reference signal density configuration and one or more instances of the second demodulation reference signal density configuration over a plurality of transmission time intervals.

17. The apparatus of claim 16, wherein the instructions are further executable by the one or more processors to cause the apparatus to:
receive, in accordance with the sequence, a first subset of the plurality of repetitions of the uplink channel in accordance with the first demodulation reference signal density configuration and a second subset of the plurality of repetitions of the uplink channel having the second demodulation reference signal density configuration.

18. The apparatus of claim 16, wherein the sequence alternates between the first demodulation reference signal density configuration and the second demodulation reference signal density configuration over the plurality of transmission time intervals.

19. The apparatus of claim 16, wherein the sequence alternates between a single instance of the first demodulation reference signal density configuration and a plurality of instances of the second demodulation reference signal density configuration over the plurality of transmission time intervals.

20. The apparatus of claim 16, wherein the control signaling indicates to restart the sequence each time a phase continuity rule is not satisfied between a consecutive pair of uplink symbol periods within a same bundling interval of the plurality of bundle intervals.

21. The apparatus of claim 16, wherein the demodulation reference signal mapping pattern that indicates the sequence corresponds to the plurality of transmission time intervals that satisfy a phase continuity rule.

22. The apparatus of claim 14, wherein the instructions to receive the first repetition and the second repetition are executable by the one or more processors to cause the apparatus to:
receive a first repetition of an uplink message on the uplink channel; and
receive a second repetition of the uplink message on the uplink channel.

23. The apparatus of claim 14, wherein the instructions to transmit the control message are executable by the one or more processors to cause the apparatus to:
transmitting, the control message that comprises an indication of a bundle size indicating a quantity of consecutive transmission time intervals in each bundle interval of the plurality of bundle intervals.

24. The apparatus of claim 14, wherein the uplink channel comprises a physical uplink control channel or a physical uplink shared channel.

25. A method for wireless communications at a user equipment (UE), comprising:
receiving, from a base station, a control message configuring the UE to transmit a plurality of repetitions of an uplink channel over a plurality of bundle intervals,
transmitting, to the base station during a first transmission time interval of a first bundle interval of the plurality of bundle intervals, a first repetition of the uplink channel in accordance with a first demodulation reference signal density configuration, and
transmitting, to the base station during a second transmission time interval of the first bundle interval, a second repetition of the uplink channel in accordance with a second demodulation reference signal density configuration, wherein the second demodulation reference signal density configuration indicates that a repetition of the uplink channel is to be transmitted without any demodulation reference signals or with a reduced quantity of demodulation reference signals as compared to the first demodulation reference signal density configuration.

26. A method for wireless communications at a base station, comprising:
transmitting, to a user equipment (UE), a control message configuring the UE to transmit a plurality of repetitions of an uplink channel over a plurality of bundle intervals;
receiving, from the UE during a first transmission time interval of a first bundle interval of the plurality of bundle intervals, a first repetition of the uplink channel in accordance with a first demodulation reference signal density configuration, and
receiving, from the UE during a second transmission time interval of the first bundle interval, a second repetition of the uplink channel in accordance with a second demodulation reference signal density configuration, wherein the second demodulation reference signal density configuration indicates that a repetition of the uplink channel is to be transmitted without any demodulation reference signals or with a reduced quantity of demodulation reference signals as compared to the first demodulation reference signal density configuration.

* * * * *